United States Patent
Ohmae et al.

(10) Patent No.: US 10,681,720 B2
(45) Date of Patent: Jun. 9, 2020

(54) WIRELESS COMMUNICATION DEVICE, WIRELESS INFORMATION COLLECTION SYSTEM, AND WIRELESS COMMUNICATION METHOD

(71) Applicant: OMRON Corporation, Kyoto (JP)

(72) Inventors: Soji Ohmae, Nara (JP); Akito Murai, Nara (JP); Manh Tai Nguyen, Kyoto (JP); Yuhki Ueyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/980,750

(22) Filed: May 16, 2018

(65) Prior Publication Data
US 2018/0359774 A1    Dec. 13, 2018

(30) Foreign Application Priority Data
Jun. 7, 2017 (JP) ................................ 2017-112885

(51) Int. Cl.
*H04W 72/12* (2009.01)
*H04W 56/00* (2009.01)
(Continued)

(52) U.S. Cl.
CPC ..... *H04W 72/1289* (2013.01); *H04W 56/002* (2013.01); *H04W 56/0015* (2013.01); *H04W 84/18* (2013.01); *H04W 92/18* (2013.01)

(58) Field of Classification Search
CPC ................................................ H04W 72/1289
See application file for complete search history.

(56) References Cited

U.S. PATENT DOCUMENTS

| 6,594,273 | B1 | 7/2003 | McGibney |
| 2005/0185628 | A1 | 8/2005 | Watanabe et al. |
| 2012/0135765 | A1 | 5/2012 | Khoo et al. |

FOREIGN PATENT DOCUMENTS

| CN | 103238367 | 5/2016 |
| EP | 1487155 | 12/2004 |

(Continued)

OTHER PUBLICATIONS

Office Action of Taiwan Counterpart Application, with English translation thereof, dated Mar. 20, 2019, pp. 1-8.

(Continued)

*Primary Examiner* — Samina F Choudhry
(74) *Attorney, Agent, or Firm* — JCIPRNET

(57) ABSTRACT

A wireless communication device, a wireless information collection system, and a wireless communication method are provided. The wireless communication device is configured to wirelessly transmit predetermined information provided therein to its master device in a predetermined transmission cycle and executes the wireless transmission in a time slot of itself according to a predetermined time division multiple access scheme together with one or more wireless slave devices including at least a reference wireless slave device. First unrelated transmission information including reference transmission time information wirelessly transmitted from the reference wireless slave device to its master device in the predetermined time division multiple access scheme is acquired during the wireless transmission and a time counted by an internal timer unit is corrected based on an amount of correction calculated from an acquisition time of the first unrelated transmission information and the reference transmission time information included in the first unrelated transmission information.

20 Claims, 11 Drawing Sheets

(51) Int. Cl.
*H04W 84/18* (2009.01)
*H04W 92/18* (2009.01)

(56) References Cited

FOREIGN PATENT DOCUMENTS

| | | |
|---|---|---|
| EP | 2695309 | 2/2014 |
| JP | 2005253038 | 9/2005 |
| JP | 2007006437 | 1/2007 |
| JP | 2007235445 | 9/2007 |
| JP | 4442338 | 3/2010 |
| WO | 2012137194 | 10/2012 |
| WO | 2017154327 | 9/2017 |

OTHER PUBLICATIONS

"Search Report of Europe Counterpart Application", dated Nov. 2, 2018, p. 1-p. 7.

| Wireless slave device ID | Transmission order |
|---|---|
| Wireless slave device 1a: X001 | 1 |
| Wireless slave device 2a: X002 | 2 |
| Wireless slave device 3a: X003 | 3 |
| Wireless slave device 4a: X004 | 4 |

FIG. 4

WIRELESS COMMUNICATION DEVICE, WIRELESS INFORMATION COLLECTION SYSTEM, AND WIRELESS COMMUNICATION METHOD

CROSS-REFERENCE TO RELATED APPLICATION

This application claims the priority benefit of Japan application serial no. 2017-112885, filed on Jun. 7, 2017. The entirety of the above-mentioned patent application is hereby incorporated by reference herein and made a part of this specification.

BACKGROUND

Technical Field

The present disclosure relates to a wireless communication device for wirelessly transmitting information provided in the wireless communication device to a master device corresponding to the wireless communication device in a time division multiple access scheme and a wireless information collection system formed by including a plurality of pairs in which the wireless communication device and the master device corresponding to the wireless communication device are paired.

Description of Related Art

In order to suitably collect information provided in terminals or the like via wireless communication, it is necessary to transmit and receive appropriate information between a transmission source and a transmission destination. For example, Japanese Patent Application Laid-Open (JP-A) No. 2007-6437 discloses technology in which each wireless device delivers time synchronization information to a wireless device for which time synchronization is not established because an obstacle exists between wireless devices in a multi-hop type wireless communication network in which there is no master. Specifically, if information is wirelessly transmitted from a certain wireless device to another wireless device, information related to a time slot of the certain wireless device is transmitted and received between wireless devices capable of ascertaining the information before the wireless transmission and time synchronization for the wireless transmission is established (the time slot for the wireless transmission is determined). Therefore, before the time synchronization is established, it is necessary to transmit and receive a plurality of signals between the wireless devices.

Further, Japanese Patent Application Laid-Open (JP-A) No. 2005-253038 and Japanese Patent Application Laid-Open (JP-A) No. 2007-235445 disclose a configuration in which a beacon signal for determining a timing at which each wireless communication terminal will perform wireless communication is transmitted in a system having a plurality of wireless communication terminals. In such a configuration, when the wireless communication terminal receives the beacon signal, it is possible to calculate a communication timing based on the information included in the beacon signal or achieve synchronization between the wireless communication terminals.

High-speed performance and high reliability of wireless communication are required for a wireless structure of a control device in the field of factory automation (FA) such as at a manufacturing site. For example, in a manufacturing site, a large number of control devices such as sensors are installed at a high density to appropriately ascertain manufacturing states. When wireless devices are installed in the control devices to collect information acquired and generated by these control devices, a large number of communication channels to be allocated to the wireless devices are required. On the other hand, because the number of communication channels is limited, wireless communication technology according to a time division multiple access scheme is used. By performing time division communication according to this technology, it becomes possible to increase the number of wireless devices to be installed in the control devices to as many as possible. Generally, if such time division communication is performed, it is necessary to achieve synchronization of communication periods so that there is no interference in the wireless communication between the wireless devices.

However, in the field of FA, there may be a timing at which a robot configured to change an orientation, a transport device configured to perform movement, or the like intervene as an obstacle between wireless devices. If communication in which synchronization for time division communication is achieved is obstructed by such an obstacle and synchronization of communication periods cannot be achieved due to an influence of shadowing, interference in wireless communication occurs, and high-speed performance and high reliability of wireless communication cannot be guaranteed. Also, a timer unit configured to count an internal time of each wireless device is important for achieving synchronization between the wireless devices. Irrespective of the technique used to determine the communication timing in each wireless device, if times within wireless devices deviate from each other, synchronization of the communication timing is not achieved as a result. According to the above-described conventional technology, it cannot be said that an adequate solution for solving these problems has been provided for the correction of a time offset between wireless devices.

SUMMARY

An aspect of the present disclosure is to provide wireless communication technology for enabling information to be collected through high-speed and high-reliability wireless communication in the field of FA.

In the present disclosure, in a wireless communication device configured to wirelessly communicate predetermined information to a master device in a predetermined time division multiple access scheme, a configuration in which transmission information between another wireless slave device configured to perform wireless communication in the same predetermined time division multiple access scheme as in the wireless communication device and a master device corresponding to the other wireless slave device is acquired, i.e., a configuration in which transmission information between another wireless slave device and a master device corresponding to the other wireless slave device operating regardless of the wireless communication device is intercepted, is adopted. In the wireless communication device according to this configuration, time information of a wireless slave device serving as a reference is acquired and used for correction of an internal time for wireless transmission of the wireless communication device, so that a time offset between the wireless communication device and the wireless slave device is eliminated and thus it is possible to collect information through high-speed and high-reliability wireless communication.

In detail, the present disclosure is a wireless communication device configured to wirelessly transmit predetermined information provided in the wireless communication device to the master device corresponding to the wireless communication device in a predetermined transmission cycle, the wireless communication device executing wireless transmission in a time slot of the wireless communication device according to a predetermined time division multiple access scheme together with one or more wireless slave devices configured to wirelessly transmit information provided in the one or more wireless slave devices from the one or more wireless slave devices different from the wireless communication device to master devices corresponding to the one or more wireless slave devices in the predetermined time division multiple access scheme. At least a reference wireless slave device is included in the one or more wireless slave devices, the reference wireless slave device being configured to wirelessly transmit reference transmission time information related to a time at which the reference wireless slave device performs wireless transmission to the master device corresponding to the reference wireless slave device in the predetermined time division multiple access scheme in addition to information provided in the reference wireless slave device. If a wireless slave device other than the reference wireless slave device is included in the one or more wireless slave devices, a predetermined wireless slave device which is the wireless slave device is configured to wirelessly transmit the reference transmission time information arriving at the predetermined wireless slave device from the reference wireless slave device as a starting point to the master device corresponding to predetermined wireless slave device in the predetermined time division multiple access scheme in addition to information provided in the predetermined wireless slave device. In addition, the wireless communication device includes an internal timer unit configured to count a time within the wireless communication device, the time slot of the wireless communication device being determined according to the time counted by the internal timer unit; an acquisition unit configured to acquire first unrelated transmission information which is transmission information wirelessly transmitted from the reference wireless slave device to the master device corresponding to the reference wireless slave device in the predetermined time division multiple access scheme and which includes the reference transmission time information at the time of the wireless transmission or acquire first unrelated transmission information which is transmission information wirelessly transmitted from the predetermined wireless slave device to the master device corresponding to the predetermined wireless slave device in the predetermined time division multiple access scheme and which includes the reference transmission time information provided in the predetermined wireless slave device at the time of the wireless transmission; and a correction unit configured to correct the time counted by the internal timer unit based on an amount of correction calculated from an acquisition time of the first unrelated transmission information from the acquisition unit represented as the time counted by the internal timer unit and the reference transmission time information included in the first unrelated transmission information.

Also, the present disclosure can be understood as an aspect of a wireless information collection system having a plurality of wireless communication combinations, each of which is formed by a wireless communication device, which is configured to wirelessly transmit predetermined information provided in the wireless communication device to a master device corresponding to the wireless communication device in a predetermined transmission cycle, and the master device, the wireless transmission being executed in accordance with a predetermined time division multiple access scheme. In this case, the wireless communication device included in one wireless communication combination among the plurality of wireless communication combinations is a reference wireless slave device, the reference wireless slave device being configured to wirelessly transmit reference transmission time information related to a time at which the reference wireless slave device performs wireless transmission to the master device corresponding to the reference wireless slave device in addition to information provided in the reference wireless slave device in the predetermined time division multiple access scheme. Also, the wireless communication device included in each of wireless communication combinations other than the one wireless communication combination among the plurality of wireless communication combinations includes an internal timer unit configured to count a time within the wireless communication device, wherein a time slot of the wireless communication device is determined according to the time counted by the internal timer unit; an acquisition unit configured to acquire first unrelated transmission information which is transmission information wirelessly transmitted from the reference wireless slave device to the master device corresponding to the reference wireless slave device in the predetermined time division multiple access scheme and which includes the reference transmission time information at the time of the wireless transmission or acquire first unrelated transmission information which is transmission information wirelessly transmitted from a predetermined wireless slave device to a master device corresponding to the predetermined wireless slave device in the predetermined time division multiple access scheme and which includes the reference transmission time information provided in the predetermined wireless slave device at the time of the wireless transmission; a correction unit configured to correct the time counted by the internal timer unit based on an amount of correction calculated from an acquisition time of the first unrelated transmission information from the acquisition unit represented as the time counted by the internal timer unit and the reference transmission time information included in the first unrelated transmission information; and a transmission unit configured to transmit the predetermined information to the master device corresponding to the wireless communication device in the time slot of the wireless communication device, and each of master devices in the plurality of wireless communication combinations includes a master-device-side transmission unit configured to transmit the predetermined information wirelessly transmitted from the wireless communication device corresponding to the master device to a predetermined information processing device. Also, technical ideas disclosed in the disclosure of the above-described wireless communication device can be applied to the disclosure of the wireless information collection system without causing technical inconsistency.

Also, the present disclosure can be understood as an aspect of a wireless communication method of wirelessly transmitting predetermined information provided in a wireless communication device to a master device corresponding to the wireless communication device in a predetermined transmission cycle. In this case, the wireless communication device executes the wireless transmission in a time slot of the wireless communication device according to a predetermined time division multiple access scheme together with one or more wireless slave devices configured to wirelessly transmit information provided in each of the one or more wireless slave devices from the one or more wireless slave devices different from the wireless communication device to master devices corresponding to the one or more wireless slave devices in the predetermined time division multiple access scheme. Also, at least a reference wireless slave device is included in the one or more wireless slave devices, the reference wireless slave device being configured to wirelessly transmit reference transmission time information related to a time at which the reference wireless slave device performs wireless transmission to the master device corresponding to the reference wireless slave device in addition to information provided in the reference wireless slave device in the predetermined time division multiple access scheme. If a wireless slave device other than the reference wireless slave device is included in the one or more wireless slave devices, a predetermined wireless slave device which is the wireless slave device is configured to wirelessly transmit the reference transmission time information arriving at the predetermined wireless slave device from the reference wireless slave device as a starting point to the master device corresponding to the predetermined wireless slave device in the predetermined time division multiple access scheme in addition to information provided in the predetermined wireless slave device. Further, in the wireless communication device, an internal timer unit counts a time within the wireless communication device, the time slot of the wireless communication device being determined according to the time counted by the internal timer unit. The wireless communication method includes the steps of: acquiring first unrelated transmission information which is transmission information wirelessly transmitted from the reference wireless slave device to the master device corresponding to the reference wireless slave device in the predetermined time division multiple access scheme and which includes the reference transmission time information at the time of the wireless transmission or acquiring first unrelated transmission information which is transmission information wirelessly transmitted from the predetermined wireless slave device to the master device corresponding to the predetermined wireless slave device in the predetermined time division multiple access scheme and which includes the reference transmission time information provided in the predetermined wireless slave device at the time of the wireless transmission; and correcting the time counted by the internal timer unit based on an amount of correction calculated from an acquisition time of the first unrelated transmission information from the acquisition unit represented as the time counted by the internal timer unit and the reference transmission time information included in the first unrelated transmission information. Also, technical ideas disclosed in the disclosure of the above-described wireless communication device can be applied to the disclosure of the wireless communication method without causing technical inconsistency.

BRIEF DESCRIPTION OF THE DRAWINGS

FIG. 4 illustrates a data structure of transmission order information provided in the wireless slave device included in the wireless information system according to the present disclosure.

DESCRIPTION OF THE EMBODIMENTS

Figure 1:
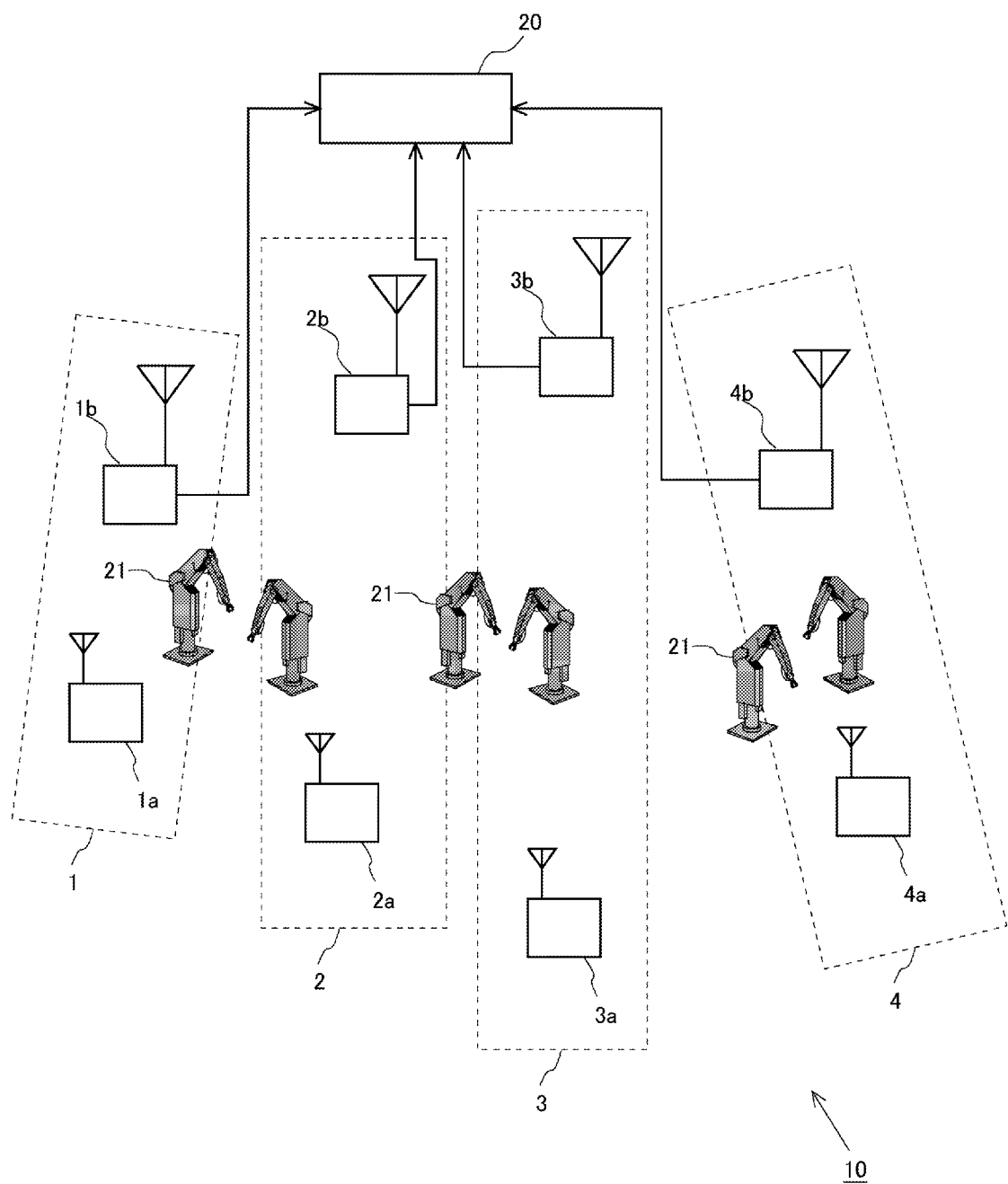
FIG. 1 is a first diagram illustrating a schematic configuration of a wireless information collection system according to the present disclosure.

The wireless communication device according to the present disclosure is configured to periodically transmit predetermined information to the master device corresponding to the wireless communication device, and the periodic transmission is performed in accordance with the predetermined time division multiple access scheme. Therefore, for a time other than a time slot allocated for the wireless communication device to perform wireless transmission (a time slot of the wireless communication device), each of communication devices other than the wireless communication device, i.e., one or more wireless slave devices, can perform wireless transmission to a master device corresponding to the communication device. As described above, the wireless communication device and the one or more wireless slave devices are involved in wireless transmission according to the predetermined time division multiple access scheme (hereinafter also simply referred to as "wireless transmission").

Here, in the wireless communication device according to the present disclosure, when predetermined information provided in the wireless communication device is intended to be transmitted to the master device, wireless transmission is performed in a time slot of the wireless communication device in consideration of synchronization with another wireless slave device related to the wireless transmission. However, at this time, if an offset occurs between the internal time counted by the internal timer unit in the wireless communication device and the internal time of each wireless slave device, there is a possibility that the wireless transmission will actually interfere even though the time slot of the wireless communication device is scheduled so that the time slot of the wireless communication device does not to overlap the time slots of other wireless slave devices. To avoid such interference in wireless transmission, it is necessary to adjust the internal time of each device, but the wireless communication device of the present disclosure does not perform a direct synchronization process with respect to other wireless slave devices. This is because, if a direct synchronization process is intended to be performed with respect to the other wireless slave devices, it is necessary to transmit and receive signals to and from the other wireless slave devices before the wireless communication device performs wireless transmission and high-speed performance of a wireless transmission requiring a relatively long time is hindered.

Therefore, in the wireless communication device according to the present disclosure, the acquisition unit acquires the first unrelated transmission information. The first unrelated transmission information is transmission information to be wirelessly transmitted by a wireless slave device (a reference wireless slave device or a predetermined wireless slave device) separate from the wireless communication device to a master device corresponding to the wireless slave device and is, so to speak, transmission information unrelated to wireless transmission between the wireless communication device and the master device corresponding to the wireless communication device. Here, the reference wireless slave device is a wireless slave device included in one or more wireless slave devices configured to perform wireless transmission together with the wireless communication device, and is a wireless slave device configured to generate time information serving as a reference of an internal time of each of the wireless communication device and all the wireless slave devices (reference transmission time information). Also, the predetermined wireless slave device refers to one representative wireless slave device other than the reference wireless slave device if a wireless slave device other than the reference wireless slave device is included in one or more wireless slave devices. The predetermined wireless slave device which is not the reference wireless slave device among the one or more wireless slave devices does not generate the time information serving as the reference of the internal time unlike the reference wireless slave device and is in a state in which reference transmission time information whose starting point is the reference wireless slave device generated by the reference wireless slave device arrives at the predetermined wireless slave device and thus the predetermined wireless slave device has the reference transmission time information.

The acquisition of the first unrelated transmission information by the acquisition unit in the wireless communication device is not a form in which the wireless communication device is designated as a transmission destination and information wirelessly transmitted from the reference wireless slave device or the predetermined wireless slave device is received, but is a form of information reception executed by the wireless communication device regardless of an intention of wireless transmission between the reference wireless slave device or the predetermined wireless slave device and the master device corresponding to the reference wireless slave device or the predetermined wireless slave device at the time of wireless transmission, and can also be expressed by a term such as reference or interception of information during the wireless transmission. Thus, the acquisition by the acquisition unit is unidirectional information acquisition without involving specific processing (signal processing for synchronization confirmation or the like) from the wireless communication device to the reference wireless slave device or the predetermined wireless slave device.

The first unrelated transmission information acquired by the acquisition unit includes the reference transmission time information. This reference transmission time information is information about a time at which the reference wireless slave device included in the one or more wireless slave devices performing wireless transmission together with the wireless communication device performing wireless transmission to the master device corresponding to the reference wireless slave device. That is, the reference transmission time information is information about an execution time of wireless transmission reflecting the internal time of the reference wireless slave device. The reference transmission time information may be acquired by the acquisition unit performing interception in the wireless transmission between the reference wireless slave device and the master device corresponding to the reference wireless slave device and may be acquired by the acquisition unit performing interception in the wireless transmission between the predetermined wireless slave device and the master device corresponding to the predetermined wireless slave device when the predetermined wireless slave device has the reference transmission time information through its own interception.

As described above, the wireless communication device acquires the reference transmission time information of the reference wireless slave device, so that the wireless communication device can ascertain an execution time of wireless transmission by the reference wireless slave device when the internal time of the reference wireless slave device is designated as a reference. Here, a time at which the acquisition unit acquires the first unrelated transmission information including the reference transmission time information is a time obtained through counting by the internal timer unit, i.e. a time at which the internal time of the wireless communication device is designated as the reference. In wireless transmission according to a predetermined time division multiple access scheme, a time slot whose length is predetermined is allocated to each of the wireless communication device and the wireless slave devices and a processing time required to acquire first unrelated transmission information is also a known length in the wireless communication device. Therefore, it is possible to calculate or estimate the execution time of wireless transmission by the reference wireless slave device when the internal time of the wireless communication device is designated as a reference based on the time at which the acquisition unit acquires the first unrelated transmission information. In view of the above, in the wireless communication device, the correction unit corrects the time counted by the internal timer unit, i.e., the internal time of the wireless communication device. That is, if an offset occurs between the internal time of the reference wireless slave device and the internal time of the wireless communication device, because there is a difference between the execution time of the wireless transmission by the reference wireless slave device when the internal time of the reference wireless slave device is designated as the reference and an estimated execution time of the wireless transmission by the reference wireless slave device when the internal time of the wireless communication device is designated as the reference, the correction unit performs the above-described correction by using the difference as an amount of correction.

The internal time of the wireless communication device is corrected by the correction unit as described above, so that the internal time of the wireless communication device is substantially synchronized with the internal time of the reference wireless slave device. Then, the reference transmission time information used for the correction by the correction unit is acquired in an acquisition process of the acquisition unit, i.e., an interception process for wireless transmission between the reference wireless slave device and the master device corresponding to the reference wireless slave device or an interception process for wireless transmission between the predetermined wireless slave device and the master device corresponding to the predetermined wireless slave device. Thus, the correction of the internal time of the wireless communication device by the correction unit can be performed at a high frequency and it is hardly affected by a local wireless communication environment in a space in which the wireless communication device or the wireless slave device is arranged. This significantly contributes to favorable information collection based on high-speed and high-reliability wireless communication in the field of FA.

Also, in the above-described wireless communication device, the first unrelated transmission information may be transmission information in which the master device corresponding to the wireless communication device is not set as a transmission destination. Also, as another method, the wireless communication device may be configured so that the wireless communication device and at least one wireless slave device among the one or more wireless slave devices have a master device, which is a transmission destination of wireless transmission according to the predetermined time division multiple access scheme, in common. In this case, the master device corresponding to the wireless communication device is set as the transmission destination in the first unrelated transmission information and therefore the acquisition unit may acquire the first unrelated transmission information transmitted from the at least one wireless slave device to the master device in common in the predetermined time division multiple access scheme. In any aspect, there is a point of agreement in that the first unrelated transmission information is not information whose transmission destination is the wireless communication device and which is wirelessly transmitted from the reference wireless slave device or the predetermined wireless slave device to the wireless communication device.

Here, in the above-described wireless communication device, if the acquisition unit acquires the first unrelated transmission information during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, the correction unit may correct the time counted by the internal timer unit based on the amount of correction corresponding to the first unrelated transmission information within the period corresponding to the other device time slot. Although a process in which the acquisition unit acquires the first unrelated transmission information is performed in another device time slot in which the wireless communication device does not perform wireless transmission and another wireless slave device performs the wireless transmission, the correction process of the correction unit is also executed within the other device time slot in which the acquisition process is performed and thus it is possible to correct the internal time at a high frequency, so to speak, every time the first unrelated transmission information is acquired.

On the other hand, the acquisition unit may not acquire the first unrelated transmission information in a certain other time slot due to shadowing or the like. In such a case, if other first unrelated transmission information has previously been acquired within one predetermined transmission cycle when wireless transmission by the reference wireless slave device is designated as the reference, the correction unit may perform a correction process by using the previously acquired information. That is, in the above-described wireless communication device, if the acquisition unit is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, the correction unit may correct the time counted by the internal timer unit based on the amount of correction corresponding to other first unrelated transmission information within the period corresponding to the other device time slot if the acquisition unit acquires the other first unrelated transmission information which is the first unrelated transmission information from a wireless slave device different from the reference wireless slave device or the predetermined wireless slave device during a period before the other device time slot in one predetermined transmission cycle when the wireless transmission by the reference wireless slave device is designated as the reference. Thereby, even though it is not possible to acquire the first unrelated transmission information from the acquisition unit in a certain other device time slot, an opportunity to perform a process of correcting an internal time can be secured.

Also, in the above-described wireless communication device, if the acquisition unit is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, a configuration in which the correction unit does not correct the time counted by the internal timer unit within the period corresponding to the other device time slot may be adopted. Thus, when the internal time is not corrected in the other device time slot, the offset is not eliminated when an offset is included in the internal time to be counted. Then, when the other device time slots in which the internal time is not corrected are continuous, the offset of the internal time accumulates.

Therefore, in the above-describe wireless communication device, if the acquisition unit acquires the first unrelated transmission information from the reference wireless slave device or the predetermined wireless slave device during a period corresponding to a predetermined other device time slot after a state in which the acquisition unit is not able to acquire the first unrelated transmission information from the reference wireless slave device or the predetermined wireless slave device continues during a period corresponding to a predetermined number of continuous other device time slots which is two or more, the correction unit may correct the time counted by the internal timer unit based on the amount of correction corresponding to the first unrelated transmission information and the predetermined number within the period corresponding to the predetermined other device time slot. In consideration of the predetermined number which is the number of other device time slots in which the first unrelated transmission information cannot be continuously acquired, it is possible to improve the accuracy of a correction process of the correction unit based on the accumulation of the internal time.

Here, in the predetermined wireless slave device, the reference transmission time information may not arrive at the predetermined wireless slave device before the information provided in the predetermined wireless slave device is wirelessly transmitted to the master device corresponding to the predetermined wireless slave device. In this case, the predetermined wireless slave device may be configured to wirelessly transmit error information indicating that the reference transmission time information has not arrived to the master device corresponding to the predetermined wireless slave device in the predetermined time division multiple access scheme in addition to information provided in the predetermined wireless slave device. By configuring the predetermined wireless slave device as described above, the wireless communication device of the present disclosure can ascertain that the predetermined wireless slave device does not have the reference transmission time information through the acquisition process of the acquisition unit when the predetermined wireless slave device executes the wireless transmission to the master device corresponding to the predetermined wireless slave device.

Therefore, in the above-described wireless communication device, if the acquisition unit acquires second unrelated transmission information including the error information, which is transmission information wirelessly transmitted to the master device corresponding to the predetermined wireless slave device in the predetermined time division multiple access scheme, from the predetermined wireless slave device instead of the first unrelated transmission information at the time of the wireless transmission during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, a configuration in which the correction unit does not correct the time counted by the internal timer unit may be adopted.

Also, as another method, in the above-described wireless communication device, if the acquisition unit acquires second unrelated transmission information including the error information, which is transmission information wirelessly transmitted to the master device corresponding to the predetermined wireless slave device in the predetermined time division multiple access scheme, from the predetermined wireless slave device instead of the first unrelated transmission information at the time of the wireless transmission during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in the one predetermined transmission cycle when the wireless transmission by the reference wireless slave device is designated as the reference, the correction unit may be configured to correct the time counted by the internal timer unit based on the amount of correction corresponding to other first unrelated transmission information within the period corresponding to the other device time slot if the acquisition unit acquires the other first unrelated transmission information which is the first unrelated transmission information from a wireless slave device different from the predetermined wireless slave device during a period before the other device time slot in one predetermined transmission cycle when the wireless transmission by the reference wireless slave device is designated as a reference. Thereby, when the acquisition unit acquires second unrelated transmission information in a certain other device time slot, it is also possible to secure an opportunity to perform a process of correcting the internal time by using other first unrelated transmission information acquired before the second unrelated transmission information.

Also, the above-described wireless communication device may further include a transmission unit configured to transmit the predetermined information to the master device corresponding to the wireless communication device in the time slot of the wireless communication device. In this case, in the wireless communication device, if the acquisition unit acquires the first unrelated transmission information during a period corresponding to another device time slot according to the predetermined time division multiple access scheme in which the reference wireless slave device or the predetermined wireless slave device performs the wireless transmission to the master device corresponding to the reference wireless slave device or the predetermined wireless slave device in a time slot immediately before the time slot of the wireless communication device in one predetermined transmission cycle when the wireless transmission by the reference wireless slave device is designated as a reference, the transmission unit may transmit the reference transmission time information included in the first unrelated transmission information to the master device corresponding to the wireless communication device together with the predetermined information. Also, if the acquisition unit does not acquire the first unrelated transmission information during the period corresponding to the other device time slot in the one predetermined transmission cycle when the wireless transmission by the reference wireless slave device is designated as the reference, the transmission unit may transmit error information indicating that the reference transmission time information has not arrived to the master device corresponding to the wireless communication device together with the predetermined information.

That is, if the first unrelated transmission information is acquired during the period corresponding to the other device time slot immediately before the time slot of the wireless communication device, the correction unit corrects the internal time by using the first unrelated transmission information and the transmission unit also wirelessly transmits the reference transmission time information included in the first unrelated transmission information to the master device corresponding to the wireless communication device, so that the other wireless slave device can intercept transmission information including the reference transmission time information included therein. In contrast, if the first unrelated transmission information cannot be acquired during the period corresponding to the other device time slot immediately before the time slot of the wireless communication device, the transmission unit also wirelessly transmits error information to the master device corresponding to the wireless communication device, so that the other wireless slave device can ascertain that there is no reference transmission time information when transmission information from the wireless communication device included therein is intercepted. In this case, the other slave device does not have to correct its own internal time or alternatively may correct its own internal time by using other information.

In a case in which the above-described wireless communication device includes the above-described transmission unit, if the acquisition unit acquires the first unrelated transmission information at least once during a period before the time slot of the wireless communication device in the one predetermined transmission cycle when the wireless transmission by the reference wireless slave device is designated as the reference, the transmission unit in the wireless communication device transmits the reference transmission time information included in the first unrelated transmission information to the master device corresponding to the wireless communication device together with the predetermined information. Also, if the acquisition unit does not acquire the first unrelated transmission information at least once during the period before the time slot of the wireless communication device in the one predetermined transmission cycle when the wireless transmission by the reference wireless slave device is designated as the reference, the transmission unit may transmit error information indicating that the reference transmission time information has not arrived to the master device corresponding to the wireless communication device together with the predetermined information.

That is, if at least the first unrelated transmission information is acquired during a period before the time slot of the wireless communication device, the correction unit corrects the internal time by using the first unrelated transmission information and the transmission unit also wirelessly transmits the reference transmission time information included in the first unrelated transmission information to the master device corresponding to the wireless communication device, so that the other wireless slave device can intercept transmission information including the reference transmission time information included therein. In contrast, if no first unrelated transmission information is acquired in the period before the time slot of the wireless communication device, the transmission unit also wirelessly transmits error information to the master device corresponding to the wireless communication device, so that the other wireless slave device can ascertain that there is no reference transmission time information when transmission information from the wireless communication device included therein is intercepted. In this case, the other slave device does not have to correct its own internal time or alternatively may correct its own internal time by using other information.

Here, to implement wireless transmission while ensuring high-speed performance and high reliability, it is necessary to minimize an internal time offset between the wireless communication device and the reference wireless slave device as much as possible as described above and determine the time slot of the wireless communication device so that the time slot of the wireless communication device does not interfere with the time slots of other wireless slave devices. Therefore, in the above-described wireless communication device, the reference wireless slave device may be configured to wirelessly transmit the reference transmission time information to the master device corresponding to the reference wireless slave device in the predetermined time division multiple access scheme in addition to information provided in the reference wireless slave device and identification information for identifying the reference wireless slave device, and the predetermined wireless slave device may be configured to wirelessly transmit the reference transmission time information arriving at the predetermined wireless slave device from the reference wireless slave device as a starting point to the master device corresponding to the predetermined wireless slave device in the predetermined time division multiple access scheme in addition to information provided in the predetermined wireless slave device and identification information for identifying the predetermined wireless slave device. Therefore, the acquisition unit may acquire the first unrelated transmission information including the identification information for identifying the reference wireless slave device and the reference transmission time information from the reference wireless slave device at the time of the wireless transmission or acquire the first unrelated transmission information including the identification information for identifying the predetermined wireless slave device and the reference transmission time information provided in the predetermined wireless slave device from the predetermined wireless slave device at the time of the wireless transmission. In addition, the wireless communication device may further include: an information storage unit configured to store transmission order information related to an order of wireless transmission of the one or more wireless slave devices and the wireless communication device in the predetermined time division multiple access scheme; and a time slot determination unit configured to determine the time slot of the wireless communication device based on the identification information included in the first unrelated transmission information acquired by the acquisition unit, an acquisition time of the first unrelated transmission information, and the transmission order information stored by the information storage unit. Also, the transmission order information may be fixed information (i.e., information when a device related or capable of being related to wireless transmission, a wireless slave device, or the like is predetermined) or variable information (information when a device related to wireless transmission, a wireless slave device, or the like changes at an appropriate time).

In the above-described configuration, the first unrelated transmission information acquired by the acquisition unit further includes identification information for identifying a wireless slave device which is a transmission entity transmitting the information. Thus, the wireless communication device according to the present disclosure can determine a wireless slave device from which wireless transmission is performed when the first unrelated transmission information is acquired. Therefore, the time slot determination unit can determine the time slot of the wireless communication device capable of wirelessly transmitting the predetermined information in wireless transmission based on the correlation related to a transmission order of a wireless slave device identified from the identification information included in the first unrelated transmission information and the wireless communication device in the transmission order information provided in the information storage unit, and an acquisition time of the first unrelated transmission information, i.e., a time related to a transmission time of the wireless slave device. That is, because the transmission order of the wireless communication device in relation to the wireless slave device is defined in the transmission order information in wireless transmission, it is possible to determine the time slot of the wireless communication device if a correlation related to the transmission order is used.

Then, the wireless communication device can wirelessly transmit the predetermined information to the master device corresponding to the wireless communication device in accordance with the predetermined time division multiple access scheme without interference with another wireless slave device by using the time slot of the wireless communication device determined by the time slot determination unit. As described above, in the wireless communication device according to the present disclosure, the time slot of the wireless communication device for wirelessly transmitting the predetermined information can be accurately determined by using first unrelated transmission information acquired by the acquisition unit in one direction. Thus, high-speed performance and high reliability of wireless transmission can be maintained. More specifically, the time slot determination unit may recognize the reference wireless slave device or the predetermined wireless slave device which is a transmission entity of the first unrelated transmission information based on the identification information included in the first unrelated transmission information and determine the time slot of the wireless communication device within the predetermined transmission cycle of the wireless communication device counted by the internal timer unit based on a correlation between the reference wireless slave device or the predetermined wireless slave device and the wireless communication device in the transmission order information and the acquisition time.

It is possible to provide a wireless communication technology for enabling information collection based on high-speed and high-reliability wireless communication in a field of FA.

Example 1

A wireless information collection system (hereinafter also simply referred to as a "system") 10 according to the present disclosure and information collection pairs 1 to 4 and an information processing device 20 included in the system will be described with reference to the drawings. Also, a configuration of the following embodiment is an example and the present disclosure is not limited to the configuration of the embodiment. FIG. 1 is a diagram illustrating a schematic configuration of the system 10 used in the field of factory automation (FA) such as in a factory and an arrangement of a plurality of information collection pairs 1 to 4 and the information processing device 20 included therein. In detail, in a region where the system 10 is formed, a group of robots 21 and a transport device within the factory are arranged, and predetermined products are manufactured by the group of robots. A variety of information (for example, information related to environmental parameters (temperature, vibration, and the like) indicating the passing through of parts and a state of a manufacturing device) related to product manufacturing are collected by the information processing device 20 through the information collection pairs 1 to 4. Because driving control of the group of robots 21 for manufacturing a product does not form a core of the present disclosure, detailed description thereof will be omitted.

Here, the information collection pairs will be described using examples of the information collection pair 1 and the information collection pair 2. The information collection pair 1 is a pair including a wireless slave device 1a corresponding to a reference wireless slave device according to the present disclosure. Also, the information collection pair 2 is a pair including a wireless slave device 2a corresponding to a wireless communication device according to the present disclosure, and description of the information collection pair 2 is also applied to the information collection pairs 3 and 4 in principle. In the present embodiment, when the wireless slave device 2a corresponds to the wireless communication device, wireless slave devices 3a and 4a of the information collection pairs 3 and 4 correspond to predetermined wireless slave devices.

The information collection pair 1 includes the wireless slave device 1a and a master device 1b and the information collection pair 2 includes the wireless slave device 2a and a master device 2b. Sensors for detecting a variety of information in a manufacturing region where the system 10 is arranged are mounted on the wireless slave devices 1a and 2a. For example, a proximity sensor for detecting the passing through and the proximity of parts in a manufacturing line and a sensor for measuring environmental parameters (temperature, humidity, acceleration, and the like) thereof can be exemplified. Information (measurement information) obtained by the mounted sensors is wirelessly transmitted from the wireless slave devices 1a and 2a to the master devices 1b and 2b corresponding to the wireless slave devices 1a and 2a. The master devices 1b and 2b are connected to the information processing device 20 via a wire and measurement information transmitted from the wireless slave device 1a and measurement information transmitted from the wireless slave device 2a are aggregated in the information processing device 20 through a wired circuit and thus are subjected to a predetermined process. Here, in addition to the above-described proximity sensor, as the sensors mounted on the wireless slave devices 1a and 2a, there are physical system sensors such as a temperature sensor, a humidity sensor, an illuminance sensor, a flow sensor, a pressure sensor, a ground temperature sensor, and a particle sensor and chemical sensors such as a $CO_2$ sensor, a pH sensor, an EC sensor, and a soil moisture sensor.

As described above, wireless transmission according to a predetermined time division multiple access scheme (hereinafter sometimes simply referred to as "wireless transmission") is performed between the wireless slave device 1a and the master device 1b in the information collection pair 1 and between the wireless slave device 2a and the master device 2b in the information collection pair 2. This predetermined time division multiple access scheme is a scheme of wireless transmission for periodic information collection by an information collection pair included in the system. Therefore, specifications such as a transmission cycle and a transmission order of wireless transmission according to the predetermined time division multiple access scheme are determined so that interference in wireless transmission does not occur between the information collection pairs. Details of the determination of a timing (a time slot) for performing wireless transmission from the wireless slave device 1a to the master device 1b according to the predetermined time division multiple access scheme will be described below.

In the system 10 configured as described above, the measurement information is acquired by the wireless slave devices 1a to 4a provided in the information collection pairs 1 to 4, and the measurement information is wirelessly transmitted to the corresponding master devices 1b to 4b. Then, the measurement information transmitted to the master device is aggregated into the information processing device 20 connected to the master devices. Here, as described above, because the predetermined time division multiple access scheme is utilized for the wireless transmission between the wireless slave device and the master device in the information collection pair, it is important to determine a time slot for wireless transmission so that there is no interference between wireless transmissions between information collection pairs. In general, synchronous communication is performed for determining a time slot for a wireless transmission. However, when the group of robots 21 configured to change an orientation in a region where wireless transmission is performed as in the system 10, a transport device configured to perform movement, and the like are provided, these may be obstacles to wireless transmission. Thus, when synchronous communication is interrupted by such obstacles and synchronization of transmission periods cannot be achieved due to the influence of shadowing, interference in wireless transmission occurs and high-speed performance and high reliability of wireless transmission cannot be guaranteed. Also, although it is assumed that there is no offset in an internal time of each wireless slave device to synchronize the wireless transmission by each wireless slave device, it is necessary to eliminate a time offset between wireless slave devices at a suitable time in order to guarantee high-speed performance and high reliability of wireless transmission, because a time offset can generally occur in a timer configured to generate an internal time in each wireless slave device.

Figure 2A:
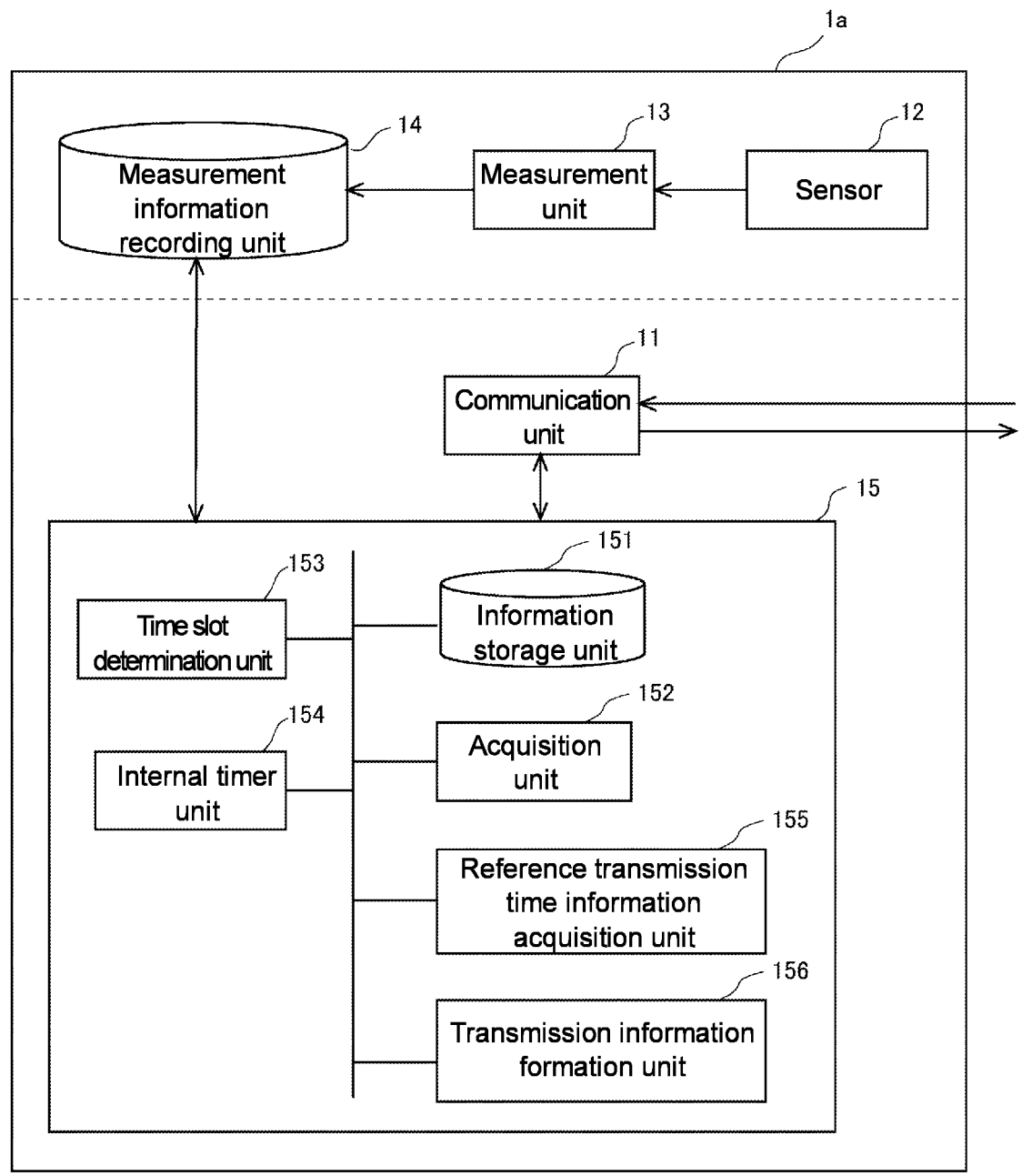
FIG. 2A is a functional block diagram of a reference wireless slave device included in a wireless information system according to the present disclosure.
Figure 2B:
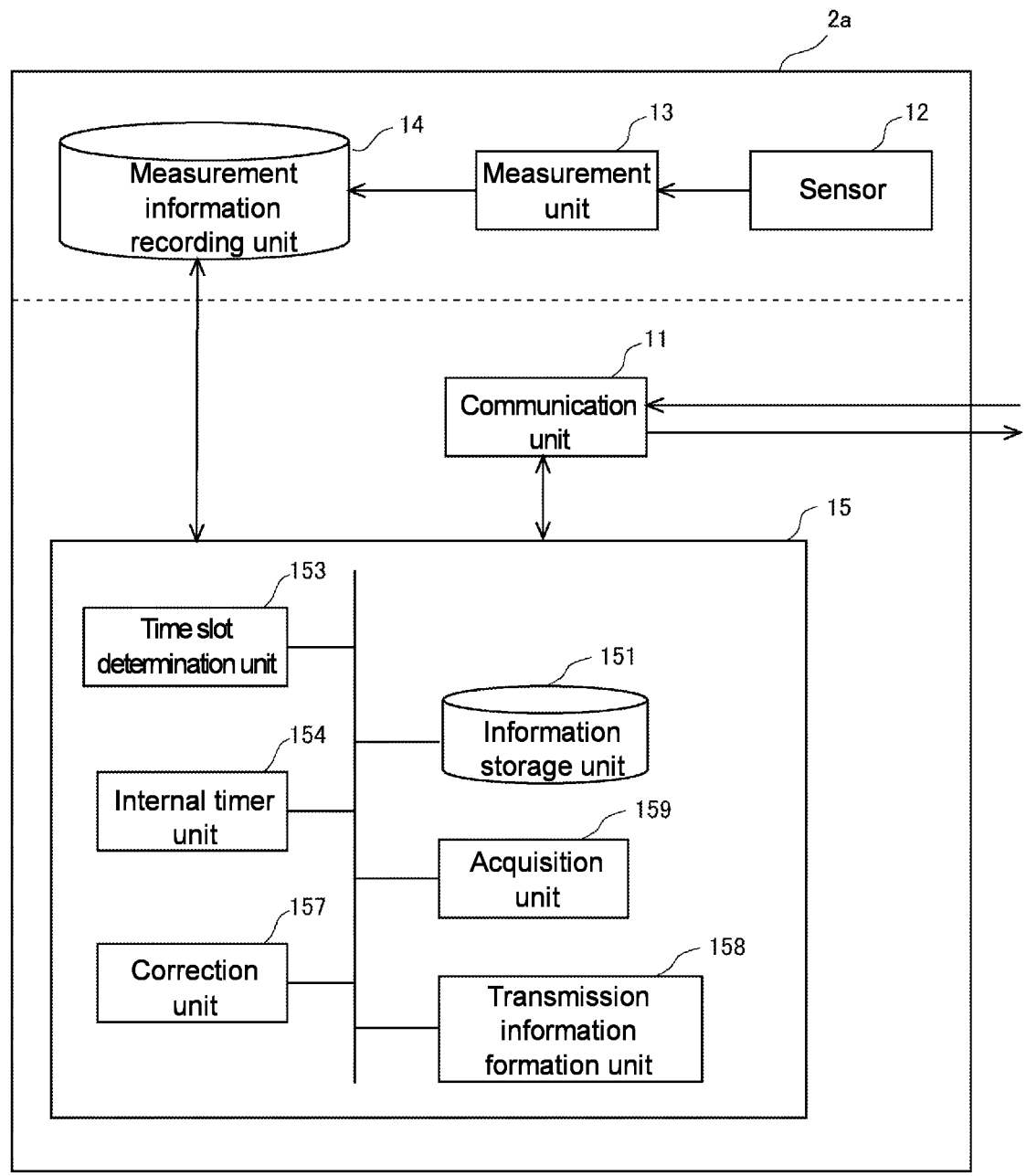
FIG. 2B is a functional block diagram of a wireless slave device other than the reference wireless slave device included in the wireless information system according to the present disclosure.

Therefore, in the present example, the elimination of a time offset between wireless slave devices capable of guaranteeing high-speed performance and high reliability of wireless transmission in an information collection pair and the determination of a time slot in which wireless transmission from a wireless slave device to a master device is permitted will be described below. FIG. 2A illustrates a functional block diagram of the wireless slave device 1a capable of eliminating a time offset and determining a time slot and FIG. 2B illustrates a functional block diagram of the wireless slave device 2a capable of eliminating a time offset and determining a time slot. The wireless slave devices 1a and 2a internally have an arithmetic device, a memory and the like, and a predetermined control program as well as the wireless communication function is executed by the arithmetic device, so that various functions are exhibited. The functional block diagrams illustrated in FIGS. 2A and 2B are images of the functions provided in the wireless slave devices 1a and 2a.

First, the wireless slave device 1a will be described. The wireless slave device 1a includes a communication unit 11, a measurement unit 13, a measurement information recording unit 14, and a control unit 15 as functional units. The control unit 15 is a functional unit configured to perform a variety of control in the wireless slave device 1a, and, in particular, includes an information storage unit 151, an acquisition unit 152, a time slot determination unit 153, an internal timer unit 154, a reference transmission time information acquisition unit 155, and a transmission information formation unit 156. The information storage unit 151 is a functional unit configured to store information about a wireless slave device included in an information collection pair participating in the system 10. This information is transmission order information about a transmission order for wirelessly transmitting the measurement information of the wireless slave device from the wireless slave device to the master device corresponding to the wireless slave device in accordance with the predetermined time division multiple access scheme in the system 10. A specific configuration of the information will be described with reference to FIG. 4 to be described below.

The acquisition unit 152 is a functional unit configured to acquire identification information of the wireless slave device 2a which is information transmitted together with measurement information (i.e., measurement information obtained in the wireless slave device 2a) transmitted by a wireless slave device different from the wireless slave device 1a (e.g., the wireless slave device 2a) to a master device corresponding to the wireless slave device 2a (e.g., the master device 2b). Also, unlike an acquisition unit 159 of another wireless slave device (for example, the wireless slave device 2a) to be described below, the acquisition unit 152 of the wireless slave device 1a does not perform a process of acquiring reference transmission time information to be described below together with the identification information of the wireless slave device. This is because the wireless slave device 1a corresponds to the reference wireless slave device according to the present disclosure and is a wireless slave device serving as a reference for an internal time of the other wireless slave device, and it is unnecessary to perform a correction process of a correction unit 157 to be described below. It can be said that an information acquisition process of the acquisition unit 152 corresponds to interception and reference operations of the wireless slave device 1a, which is not an original transmission destination in the information transmission process, instead of an operation corresponding to reception of information from a transmission source to a transmission destination (the master device corresponding to the transmission source) for which the information was originally intended to be transmitted.

Furthermore, the time slot determination unit 153 is a functional unit configured to determine a time slot in which the wireless slave device 1a will wirelessly transmit the measurement information to the master device 1b based on identification information of a wireless slave device different from its own device acquired by the acquisition unit 152, an acquisition time of the identification information, and transmission order information stored in the information storage unit 151. Because the wireless slave device included in the information collection pair participating in the system 10 periodically wirelessly transmits the measurement information to the master device corresponding to the wireless slave device through wireless transmission according to the predetermined time division multiple access scheme, the time slot determination unit 153 determines a time slot for the wireless slave device 1a so that interference does not occur in wireless transmissions between the information collection pairs. Details of the specific determination of the time slot will be described below. Also, the internal timer unit 154 is a functional unit configured to count the time within the wireless slave device 1a. The internal time of the internal timer unit 154 is independently counted without being synchronized with those of other wireless slave devices.

Also, the reference transmission time information acquisition unit 155 is a functional unit configured to acquire reference transmission time information which is information about a reference transmission time by designating a time at which measurement information is wirelessly transmitted from the wireless slave device 1a to the master device 1b corresponding to the wireless slave device 1a as the reference transmission time. The reference transmission time is determined by the time counted by the internal timer unit 154. The transmission information formation unit 156 is a functional unit configured to form transmission information to be transmitted to the master device 1b. The transmission information includes the measurement information measured by the sensor 12, the reference transmission time information, and identification information of the wireless slave device 1a.

The measurement unit 13 is a functional unit configured to perform measurement via the sensor 12. The measurement information from the measurement unit 13 is stored within a memory at any time by the measurement information recording unit 14 according to an instruction of the control unit 15. The measurement information recording unit 14 is formed to interact with the control unit 15. In accordance with an instruction from the control unit 15, the recorded measurement information is delivered to the control unit 15 and the formation of the transmission information for the master device 1b is performed by the transmission information formation unit 156.

The communication unit 11 is a functional unit configured to perform communication outside of the wireless slave device 1a, i.e., transmission and reception of information to and from outside of the wireless slave device 1a. Specifically, the communication unit 11 is formed to interact with the control unit 15. As a result, the communication unit 11 is involved in transmission of transmission information generated based on the recorded measurement information to the master device 1b and involved in reception (interception) for information acquisition by the acquisition unit 152.

Next, the wireless slave device 2a will be described. The wireless slave device 2a includes the communication unit 11, the measurement unit 13, the measurement information recording unit 14, and the control unit 15 as functional units. The control unit 15 is a functional unit configured to perform a variety of control in the wireless slave device 2a and particularly includes the information storage unit 151, the acquisition unit 159, the time slot determination unit 153, the internal timer unit 154, the correction unit 157, and a transmission information formation unit 158. Among these functional units, functional units substantially the same as those of the wireless slave device 1a are denoted by the same reference numerals. Detailed description of functional units substantially the same will be omitted.

Here, the acquisition unit 159 included in the wireless slave device 2a is a functional unit configured to acquire first unrelated transmission information which is transmitted together with measurement information (i.e., measurement information obtained in the wireless slave device 1a) transmitted to a master device (e.g., the master device 1b) corresponding to the wireless slave device 1a by a wireless slave device (e.g., the wireless slave device 1a) different from the wireless slave device 2a and which includes identification information of the wireless slave device different from the wireless slave device 2a and the above-described reference transmission time information. Thus, unlike the acquisition unit 152 of the wireless slave device 1a, the acquisition unit 159 of the wireless slave device 2a performs a process of acquiring the reference transmission time information together with the identification information of the wireless slave device. This is because the wireless slave device 2a is a wireless communication device according to the present disclosure and performs a correction process of the correction unit 157 based on a reference transmission time of the wireless slave device 1a serving as a reference wireless slave device. Also, the acquisition unit 159 can acquire second unrelated transmission information including error information instead of the reference transmission time information in addition to the identification information of the wireless slave device different from the wireless slave device 2a. The error information is information indicating that the reference transmission time information has not arrived at a wireless slave device other than the wireless slave device 1a and details thereof will be described below. The first unrelated transmission information and the second unrelated transmission information are information unrelated to information to be transmitted to the master device 2b corresponding to the wireless slave device 2a and are information whose transmission destination is not the wireless slave device 2a. Therefore, it can be said that acquisition of the first unrelated transmission information and the second unrelated transmission information by the acquisition unit 159 corresponds to interception and reference operations of the wireless slave device which is not an original transmission destination in the information transmission process, instead of an operation corresponding to reception of information from a transmission source to a transmission destination (the master device corresponding to the transmission source) for which the information was originally intended to be transmitted. Also, in the present example, the first unrelated transmission information and the second unrelated transmission information may be collectively referred to as "unrelated transmission information."

Furthermore, the correction unit 157 is a functional unit configured to correct the internal time counted by the internal timer unit 154 based on the reference transmission time information included in the first unrelated transmission information acquired by the acquisition unit 159. Details of the correction process will be described below. The transmission information formation unit 158 is a functional unit configured to form transmission information to be transmitted to the master device 2b. The transmission information includes measurement information measured by the sensor 12 (measurement information recorded in the measurement information recording unit 14), the above-described reference transmission time information, and the identification information of the wireless slave device 2a. As another method, the transmission information may include measurement information measured by the sensor 12, the above-described error information, and the identification information of the wireless slave device 2a.

<Transmission Process>

Figure 3:
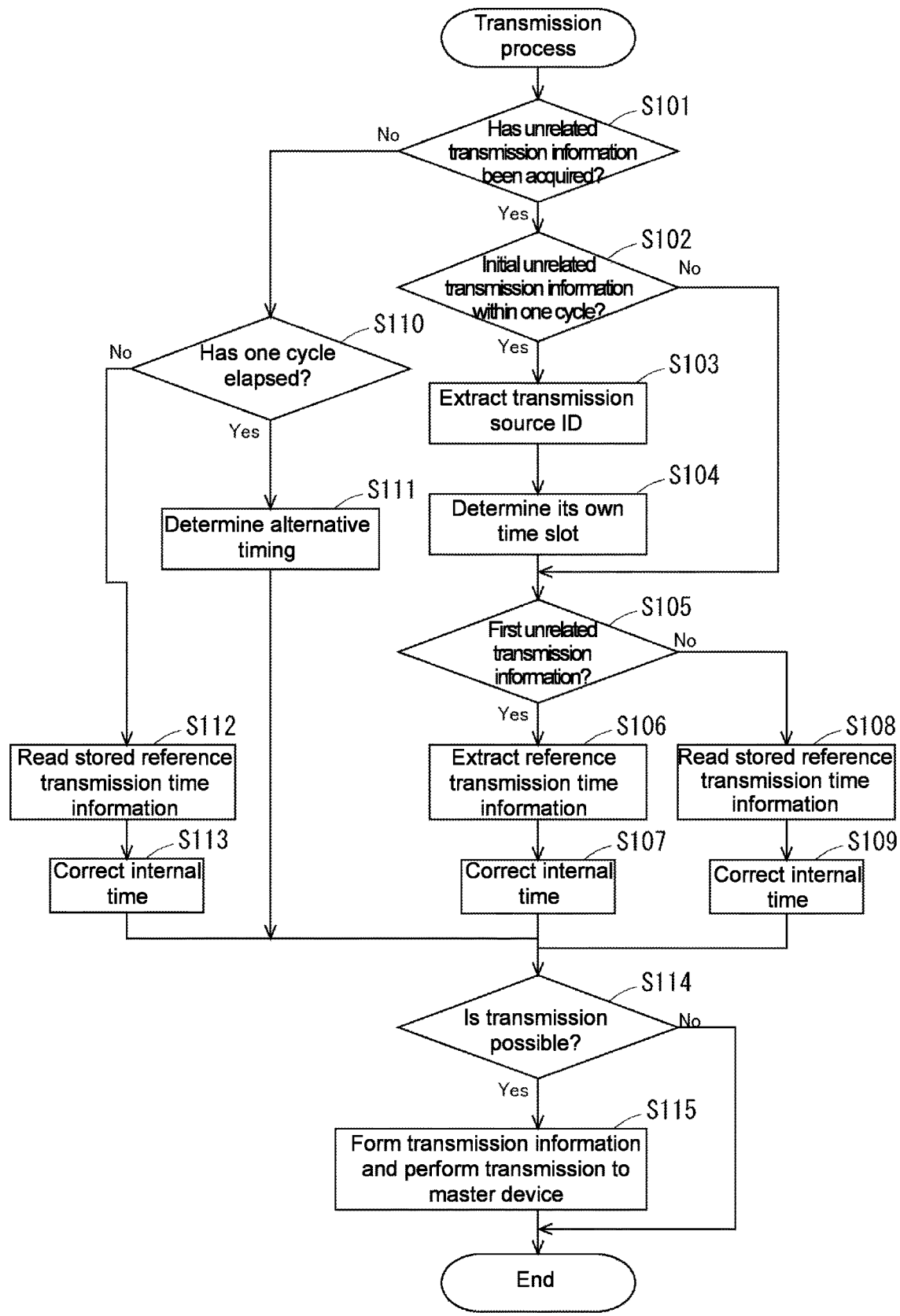
FIG. 3 is a flowchart of a transmission process executed in a wireless slave device included in the wireless information system according to the present disclosure.

A transmission process of collecting measurement information in an information collection pair including a wireless slave device having the configuration as illustrated in FIGS. 2A and 2B, i.e., a process of transmitting the above-described transmission information to a master device performed in the wireless slave device in the information collection pair, will be described with reference to FIGS. 3 and 4. An internal time is corrected based on the reference transmission time information whose starting point is the wireless slave device 1a and which arrives at each wireless slave device with respect to a wireless slave device other than the wireless slave device 1a which is the reference wireless slave device so that wireless transmissions do not interfere with each other when wireless transmission from the wireless slave device included in each pair is performed in accordance with the predetermined time division multiple access scheme between information collection pairs participating in the system 10 and the wireless transmission is executed in accordance with a time slot determined by the time slot determination unit 153 provided in each wireless slave device. The transmission process according to the flowchart illustrated in FIG. 3 is a process performed in a wireless slave device other than the wireless slave device 1a, and is implemented by the control unit 15 executing a predetermined control program in each wireless slave device. In the wireless slave device 1a, an internal time correction process (the processing of S107, S109, and S113 to be described below) is not performed and a process related to the determination of the time slot by the time slot determination unit 153 is performed. In the description of the transmission process illustrated in FIG. 3, the transmission process is assumed to be executed in the wireless slave device 2a as an example.

First, in S101, it is determined whether or not the unrelated transmission information has been acquired by the acquisition unit 152. The unrelated transmission information includes the first unrelated transmission information and the second unrelated transmission information, and any unrelated transmission information commonly includes identification information for identifying a wireless slave device which is a transmission entity transmitting the information. The unrelated transmission information is obtained by the acquisition unit 159 acquiring (intercepting and referring to) transmission information transmitted from a wireless slave device other than the wireless slave device 2a to a master device corresponding to the wireless slave device. The process proceeds to S102 when an affirmative determination is made in S101 and the process proceeds to S110 when a negative determination is made. Then, in S102, it is determined whether or not the unrelated transmission information determined to be acquired in S101 is initial unrelated transmission information within one transmission cycle of the wireless slave device 2a after the transmission information was transmitted for the previous time. If an affirmative determination is made in S102, the process proceeds to S105 via S103 and S104. If a negative determination is made, the process directly proceeds to S105. S103 and S104 are processing related to the determination of the time slot of the wireless slave device 2a by the time slot determination unit 153. Therefore, the processing related to the determination of the time slot of the wireless slave device 2a is executed only when an affirmative determination is made in S102, i.e., only when the initial unrelated transmission information within one transmission cycle of the wireless slave device 2a is acquired.

Therefore, in S103, the identification information of the wireless slave device which is the transmission source transmitting the initial unrelated transmission information included in the initial unrelated transmission information within one transmission cycle of the wireless slave device 2a is extracted. For example, if the wireless slave device 1a transmits the initial unrelated transmission information, identification information of the wireless slave device 1a included therein is extracted. Through this extraction, the wireless slave device 2a can recognize that the unrelated transmission information has been acquired from the wireless slave device 1a in the information collection pair participating in the system 10. When the processing of S103 is completed, the process proceeds to S104.

In S104, a time slot of the wireless slave device 2a which is a time slot in which the wireless slave device 2a wirelessly transmits transmission information in accordance with a predetermined time division multiple access scheme subsequently is determined based on the acquisition time of the initial unrelated transmission information, the identification information of the wireless slave device 1a serving as the transmission source extracted in S103, and the transmission order information provided in the information storage unit 151. Also, the acquisition time of the initial unrelated transmission information is a time at which the initial unrelated transmission information was acquired by the acquisition unit 159 and is a time specified by the count of the internal timer unit 154 of the wireless slave device 2a. Also, the configuration of the transmission order information provided in the information storage unit 151 is illustrated in FIG. 4. In the transmission order information, identification information of wireless slave devices included in four information collection pairs participating in the system 10 are associated with a transmission order. In the example illustrated in FIG. 4, in order to avoid interference in wireless transmission in the system 10, wireless transmission is determined to be performed in a time division manner in the order of the wireless slave devices 1a, 2a, 3a, and 4a. Also, after the wireless slave device 4a determined to be last in order performs wireless transmission, the wireless slave device 1a determined to be first in order continuously performs wireless transmission.

Here, the transmission cycle in wireless transmission according to the predetermined time division multiple access scheme is assumed to be 40 msec and a time of the transmission cycle is assumed to correspond to 40 clocks counted by the internal timer unit 154. According to the transmission order information illustrated in FIG. 4, the wireless slave device 2a subsequently performs wireless transmission to the wireless slave device 1a transmitting the initial first unrelated transmission information. Therefore, when a time at which the wireless slave device 1a transmits the above-described initial unrelated transmission information is regarded to be a time at which the wireless slave device 2a acquires the initial unrelated transmission information, the time slot determination unit 153 determines a time slot of the wireless slave device 2a serving as the next wireless slave device for performing wireless transmission from the acquisition time. Also, as another method, when the above-described unrelated transmission information is the first unrelated transmission information, reference transmission time information included therein may be used as the time at which the wireless slave device 1a transmits the above-described initial unrelated transmission information. Because the wireless transmission by the four wireless slave devices is performed in accordance with the predetermined time division multiple access scheme, the system 10 can allocate a time slot of a length of 10 msec (a length corresponding to 10 clocks) at most for one wireless slave device. Therefore, the time slot determination unit 153 determines a period of 10 msec (10 clocks worth of data) starting from a time after 10 msec (10 clocks) which is a time slot length for one wireless slave device as the time slot for the wireless slave device 2a by designating the acquisition time of the initial unrelated transmission information from the wireless slave device 1a as a reference. When the processing of S104 is completed, the process proceeds to S105.

Also, a process related to the correction of the internal time of the wireless slave device 2a is performed in the next processing of S105 to S109. Before description of the correction process, a process when a negative determination is made in S101 and the process proceeds to S110 will be described. In S110, it is determined whether or not one transmission cycle of the wireless slave device 2a has elapsed after previous transmission of the transmission information. That is, in S110, it is determined whether or not it is impossible to acquire unrelated transmission information from any wireless slave device within the one transmission cycle. If an affirmative determination is made in S110, the process proceeds to S111. If a negative determination is made, the process proceeds to S112. Thereby, if the first unrelated transmission information or the second unrelated transmission information cannot be acquired from another wireless slave device within one transmission cycle in the wireless slave device 2a, the processing of S111 is performed. Then, in S111, an alternative timing is determined. The alternative timing is a transmission timing alternatively determined for wireless transmission of the next transmission information when the time slot determination unit 153 cannot determine the time slot of the wireless slave device 2a in the wireless slave device 2a. In the case of the present example, a past time slot of the wireless slave device 2a determined within a cycle closest to the one cycle is used as the alternative timing. When the processing of S111 is completed, the process proceeds to S114. Also, when a negative determination is made in S110, the process proceeds to S112 and S113. In S112 and S113, processing relating to correction of the internal time of the wireless slave device 2a is performed. Details thereof will be described below.

Here, the description returns to the processing of S105. After the processing of S104 or after a negative determination in S102, it is determined whether or not the unrelated transmission information acquired by the acquisition unit 159 is the first unrelated transmission information in S105. If an affirmative determination is made in S105, the process proceeds to S106 and S107. If a negative determination is made in S105, i.e., if the unrelated transmission information is the second unrelated transmission information, the process proceeds to S108 and S109.

Here, in S106, reference transmission time information included in the first unrelated transmission information is extracted based on the fact that the unrelated transmission information acquired by the acquisition unit 159 is the first unrelated transmission information. As described above, when the wireless slave device 1a performs wireless transmission to the master device 1b corresponding to the wireless slave device 1a, the reference transmission time information acquired by the reference transmission time information acquisition unit 155 is wirelessly transmitted to the master device 1b together with measurement information and identification information of the wireless slave device 1a, and details of the information are acquired by the acquisition unit 159 of the wireless slave device 2a. In S106, the reference transmission time information is extracted from the acquired information. Also, as described below, if the reference transmission time information is extracted in the wireless slave devices 2a, 3a, and 4a at the time of wireless transmission of another wireless slave device as described above, the extracted reference transmission time information is wirelessly transmitted together with the measurement information and identification information of the wireless slave devices 2a, 3a, and 4a when the measurement information of the wireless slave devices 2a, 3a, and 4a is wirelessly transmitted. According to such a configuration, in S106, even when wireless transmission from a wireless slave device, which is not the reference wireless slave device, to a master device corresponding to the wireless slave device is performed, the reference transmission time information is extracted from the first unrelated transmission information acquired by the acquisition unit 159 and another wireless slave device can secure an opportunity to acquire the reference transmission time information.

When the processing of S106 is completed, the process proceeds to S107. In S107, the internal time of the wireless slave device 2a is corrected based on the reference transmission time information extracted in S106. A specific correction process will be described below. Here, the reference transmission time based on the reference transmission time information is set as TS1 and a time at which the first unrelated transmission time information including the reference transmission time information is acquired is set to t'. The former TS1 is a time specified in accordance with the internal time of the wireless slave device 1a which is the reference wireless slave device, and the latter t' is an acquisition time specified in accordance with the internal time of the wireless slave device (e.g., the wireless slave device 2a) acquired by the acquisition unit 159. Here, based on the acquisition time t', a transmission time t1 of the wireless slave device 1a, which is the reference wireless slave device, according to the internal time of the wireless slave device 2a can be calculated in accordance with the following Equation (1). Also, here, a time slot number n is incremented in accordance with the transmission order illustrated in FIG. 4 when a number of a time slot in which the wireless slave device 1a, which is the reference wireless slave device, performs the wireless transmission to the master device 1b corresponding to the wireless slave device 1a is set to 1 in one transmission cycle. Therefore, the number n of the time slot in which the wireless slave device 2a performs wireless transmission to the master device 2b corresponding to the wireless slave device 2a is set to 2, the number n of the time slot in which the wireless slave device 3a performs wireless transmission to the master device 3b corresponding to the wireless slave device 3a is set to 3, and the number n of the time slot in which the wireless slave device 4a performs wireless transmission to the master device 4b corresponding to the wireless slave device 4a is set to 4.

$$t1 = \text{acquisition time } t' - 10 \text{ msec} \times (\text{time slot number } n-1) - \text{processing time } \Delta t \quad \text{Equation (1)}$$

Therefore, for example, if the wireless slave device 2a acquires the first unrelated transmission information in the time slot in which the wireless slave device 1a, which is the reference wireless slave device, performs wireless transmission to the master device 1b corresponding to the wireless slave device 1a, it is only necessary to assign 1 to the time slot number n in Equation (1). As another example, if the wireless slave device 2a acquires the first unrelated transmission information in the time slot in which the wireless slave device 3a performs wireless transmission to the master device corresponding to the wireless slave device 3a, it is only necessary to assign 3 to the time slot number n in Equation (1). Also, the above 10 msec is a length of a predetermined time slot, and the processing time $\Delta t$ is a time required for processing (software processing or the like) for acquiring information within the wireless slave device, and is a time known in advance (specifically, it corresponds to the processing time $\Delta t$ illustrated in FIG. 5).

Here, when there is no offset between the internal time of the wireless slave device 1a, which is the reference wireless slave device, and the internal time of the wireless slave device 2a, the reference transmission time TS1 and the transmission time t1 calculated in accordance with the above Equation (1) theoretically coincide with each other. When a time offset Toffset (=TS1−t1) exists between the reference transmission time TS1 and the calculated transmission time t1, it is possible to cause the internal time of the wireless slave device 2a to coincide with the internal time of the wireless slave device 1a which is the reference wireless slave device by correcting the internal time based on the time offset Toffset because the time offset Toffset means that the internal time of the wireless slave device 2a deviates when the internal time of the wireless slave device 1a is set as a reference. Therefore, in S107, the correction unit 157 calculates the time offset Toffset in accordance with the above Equation (1) based on the reference transmission time information extracted in S106, and the internal time of the wireless slave device 2a is corrected, so that the time offset between the wireless slave devices is eliminated. Specifically, if Toffset<0, the internal time of the wireless slave device 2a is corrected to be advanced by |Toffset|. In contrast, if Toffset>0, the internal time of the wireless slave device 2a is corrected to be delayed by |Toffset|. When the processing of S107 is completed, the process proceeds to S114. The time offset corresponds to an amount of correction of the present disclosure.

Next, a case in which a negative determination is made in S105 and the process proceeds to S108 will be described. Here, if the unrelated transmission information acquired by the acquisition unit 159 is not the first unrelated transmission information, i.e., if the unrelated transmission information is the second unrelated transmission information, the correction process of the correction unit 157 as shown in S107 described above is not performed based on the acquired second unrelated transmission information because the second unrelated transmission information includes error information instead of the reference transmission time information. Therefore, in view of the above, in S108, in one transmission cycle when the wireless transmission by the wireless slave device 1a, which is the reference wireless slave device, is designated as a reference, the latest reference transmission time information, which is reference transmission time information used in the processing of S107 previously performed, within reference transmission time information stored in the memory of the wireless slave device 2a is read. Then, in S109, a correction process of the correction unit 157 is performed based on the read reference transmission time information. Also, as another method of the correction process when the second unrelated transmission information including the error information is acquired, an amount of correction calculated from reference transmission time information of a plurality of times acquired in a past time slot may be stored and an average value or a median value of a plurality of amounts of correction may be used. As still another method of the correction process, at a stage before the transmission process illustrated in FIG. 3 is executed in the system 10, the transmission process is attempted in a state where the group of robots 21 is operated, and each wireless slave device pre-stores an average value, a median value, or the like based on amounts of correction for a plurality of times calculated from the reference transmission time information included in the first unrelated transmission information acquired at that time. Then, if the second unrelated transmission information is acquired, the correction process of S109 may be performed using the stored amount of correction.

Next, a case in which a negative determination is made in S110 and the process proceeds to S112 will be described. Here, if neither the first unrelated transmission information nor the second unrelated transmission information has been acquired by the acquisition unit 159, the correction process of the correction unit 157 cannot be performed as shown in S107 described above. Therefore, in view of the above, the latest reference transmission time information within the reference transmission time information stored in the memory of the wireless slave device 2a is also read in S112 as in S108. Then, in S113, the correction process of the correction unit 157 is performed based on the read reference transmission time information. As another method, the correction process of S113 may be performed using an average value of amounts of correction in a plurality of times in the past or an amount of correction obtained in a preliminary trial operation.

Then, after the processing of S107, S109, and S113, in S114, based on the determination of the time slot of the wireless slave device 2a in S104 or the determination of the alternative timing in S111, it is determined whether or not the determined timing has been reached and the transmission information can be transmitted. Also, the arrival of the timing is determined in accordance with the count of the internal timer unit 154. If an affirmative determination is made in S114, the process proceeds to S115, the transmission information formation unit 158 forms transmission information, and the formed transmission information is wirelessly transmitted to the master device 2b via the communication unit 11. In the formation of the transmission information by the transmission information formation unit 158, transmission information is formed by adding the reference transmission time information included in the first unrelated transmission information or the error information included in the second unrelated transmission information acquired by the acquisition unit 159 to the measurement information recorded in the measurement information recording unit 14 and the identification information of the wireless slave device 2a. If neither the first unrelated transmission information nor the second unrelated transmission information can be acquired, transmission information is formed by adding newly generated error information to the measurement information and the identification information of the wireless slave device 2a.

Another form of transmission information formation by the transmission information formation unit 158 will also be mentioned. Even when the second unrelated transmission information is acquired by the acquisition unit 159 or even when no unrelated transmission information has been acquired by the acquisition unit 159, the transmission information may be formed to include the reference transmission time information included in the first unrelated transmission information if the first unrelated transmission information has been previously acquired by the acquisition unit 159 at least once in one transmission cycle when wireless transmission by the wireless slave device 1a which is the reference wireless slave device is designated as a reference.

In this manner, because the internal time correction process is performed by the correction unit 157 in the above-described transmission process, it is possible to adjust the internal time of the wireless slave device 2a as much as possible to the internal time of the wireless slave device 1a, which is the reference wireless slave device. Particularly, in principle, a process of correcting an internal time is performed based on the reference transmission time information included in the acquired first unrelated transmission information every time the first unrelated transmission information is acquired and therefore correction of an internal time is performed with a high frequency. As a result, the time offset due to the count of the internal timer unit 154 can be corrected successively, thereby enabling wireless transmission to be accurately performed in accordance with the time slot of the wireless slave device 2a determined by the time slot determination unit 153. The correction process can be similarly applied to the wireless slave devices 3a and 4a having the correction unit 157. Also, in the correction process of S109 and S113, the reference transmission time information extracted at that time point is not used and the reference transmission time information stored in the memory is used. This is a significant process in that a frequency of correction of the internal time is secured. As another method, if the second unrelated transmission information including error information is acquired (when a negative determination is made in S105), or if neither first unrelated transmission information nor second unrelated transmission information is acquired (if a negative determination is made in S110), the above-described correction process may not be performed.

Also, the wireless slave device 2a determines its own time slot for transmitting the transmission information based on the unrelated transmission information acquired by the acquisition unit 159. This unrelated transmission information is information periodically transmitted from a wireless slave device other than the wireless slave device 2a to a master device corresponding to the wireless slave device and is only information passively acquired for the wireless slave device 2a without being transmitted in accordance with a request from the wireless slave device 2a. Thus, acquisition of unrelated transmission information is relatively easy and a time required for the acquisition is extremely short. Even if the unrelated transmission information cannot be acquired within one transmission cycle, because the wireless transmission is performed at a timing determined as an alternative, hindrance to the collection of the measurement information is avoided as much as possible. From this point of view, the transmission process illustrated in FIG. 3 enables information to be collected through high-speed and high-reliability wireless transmission, particularly, in the field of FA.

<Flow 1 of Wireless Transmission of Transmission Information in System 10>

Figure 5:
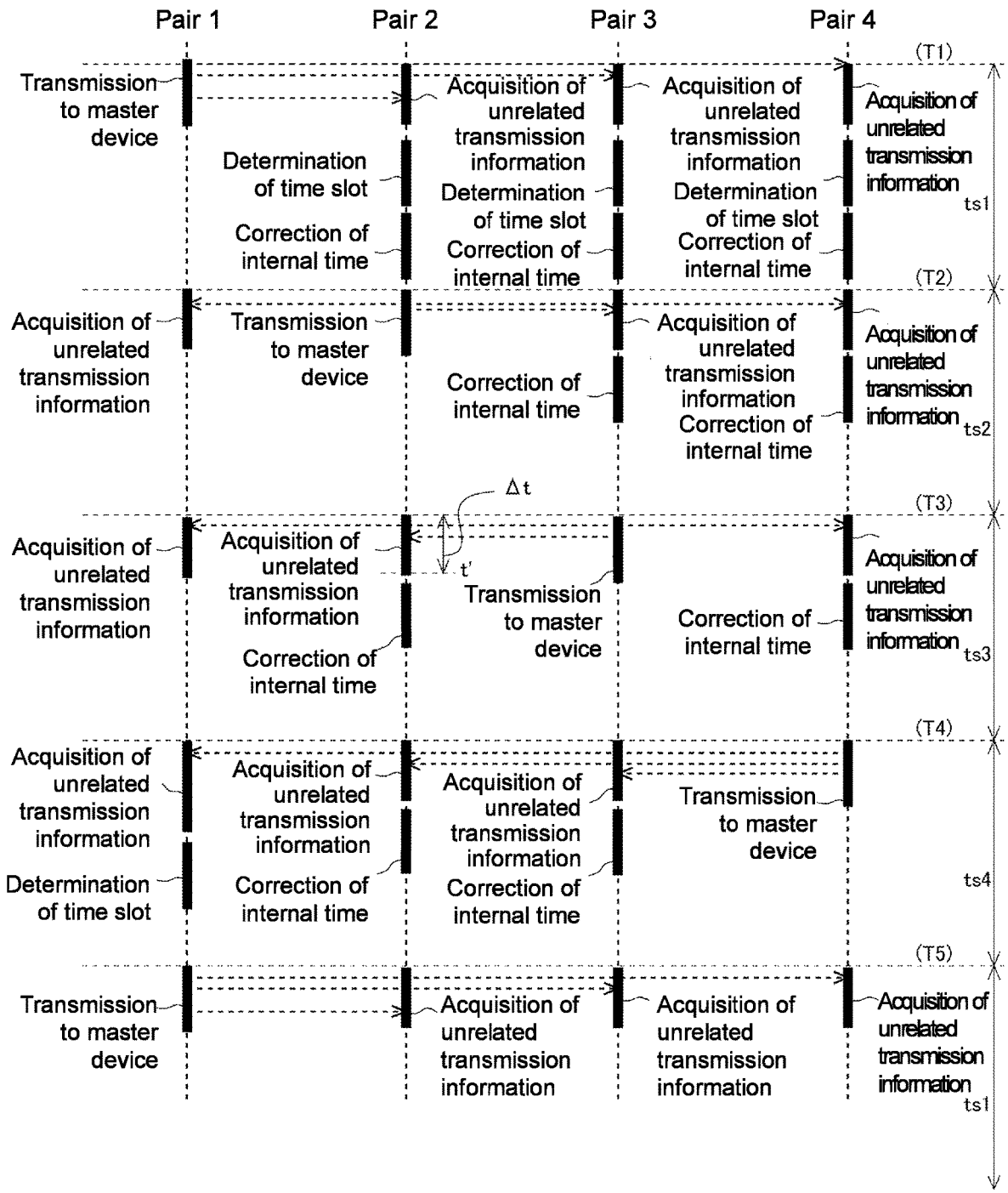
FIG. 5 is a first diagram illustrating a flow of information exchange performed in the wireless information system illustrated in FIG. 1.

Here, when the transmission process illustrated in FIG. 3 is executed by the wireless slave devices 2a to 4a included in the information collection pairs 2 to 4, a flow of the wireless transmission process of collecting the transmission information performed in the system 10 will be described with reference to FIG. 5. In FIG. 5, each of the axes of the pairs 1 to 4 represents a process of the wireless slave device included in each information collection pair. In the flow of the process illustrated in FIG. 5, at time T1, wireless transmission of transmission information from the wireless slave device 1a of the information collection pair 1 to the master device 1b is performed. Also, times T1 to T5 illustrated in FIG. 5 are times specified in accordance with the internal time of the wireless slave device 1a which is the reference wireless slave device. Because the internal time correction process is not performed with respect to the wireless transmission in the wireless slave device 1a, the wireless transmission in the wireless slave device 1a is executed according to a process other than the process related to the correction of the internal time within the transmission process illustrated in FIG. 3. The transmission information at that time is formed by adding the reference transmission time information acquired by the reference transmission time information acquisition unit 155 to the measurement information and the identification information of the wireless slave device 1a in the transmission information formation unit 156. In correspondence with the wireless transmission of the transmission information from the wireless slave device 1a, the acquisition units 159 of the wireless slave device 2a of the information collection pair 2, the wireless slave device 3a of the information collection pair 3, and the wireless slave device 4a of the information collection pair 4 substantially simultaneously acquire the transmission information as the first unrelated transmission information of the wireless slave devices.

Figure 6:
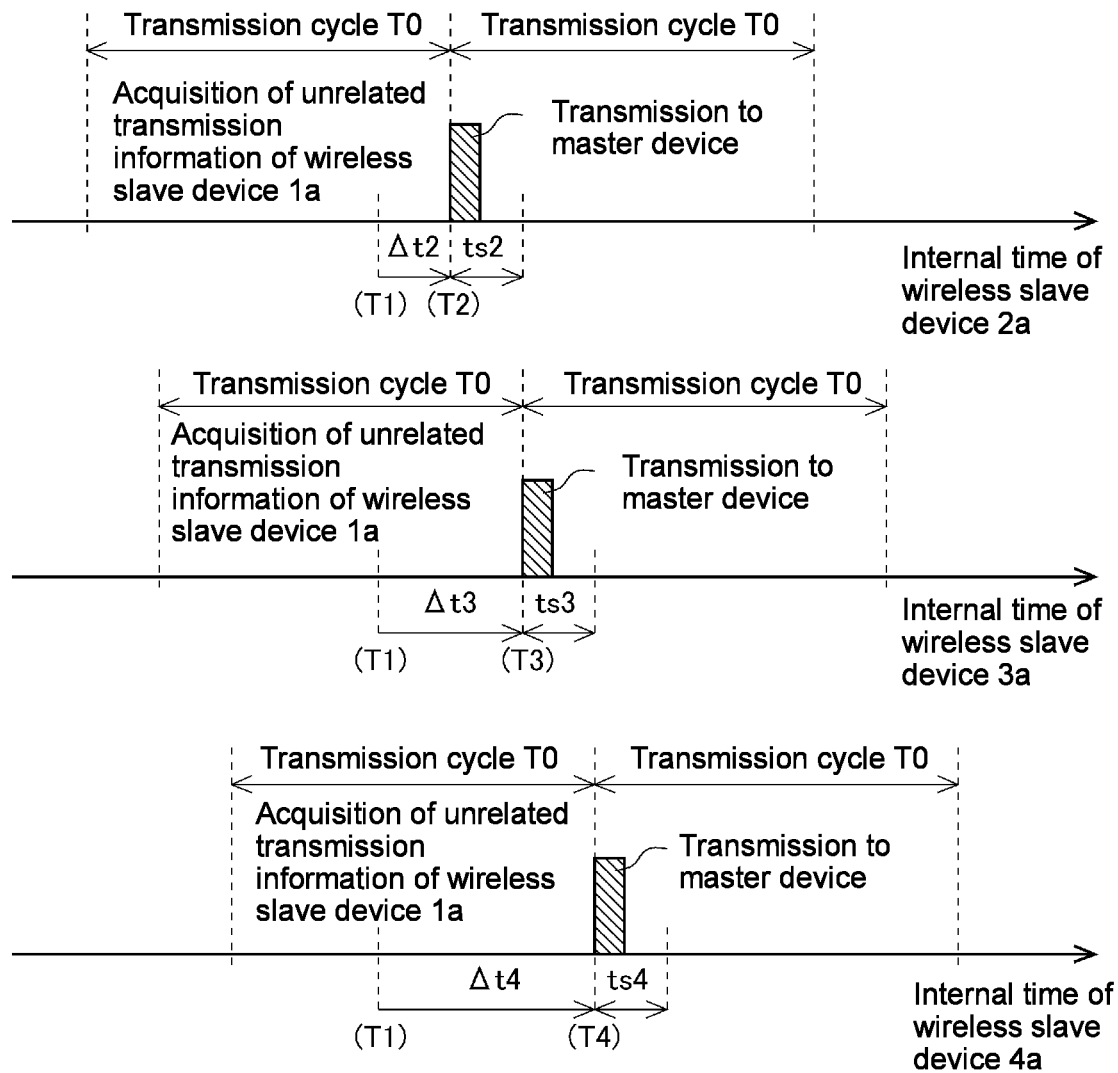
FIG. 6 is a diagram illustrating timings of wireless transmissions to master devices corresponding to wireless slave devices 2a to 4a performed in the wireless slave devices 2a to 4a in the information exchange illustrated in FIG. 5.

Then, in each of the wireless slave devices 2a to 4a acquiring the first unrelated transmission information, the time slot determination unit 153 determines a time slot for each wireless slave device. Here, correlations between the acquisition time T1 of the first unrelated transmission information and time slots ts2 to ts4 to be determined in the wireless slave devices 2a to 4a are illustrated in FIG. 6. In FIG. 6, an upper part shows the correlation in the wireless slave device 2a, a middle part shows the correlation in the wireless slave device 3a, and a lower part shows the correlation in the wireless slave device 4a. As shown in the transmission order information of FIG. 4, the wireless slave device 2a performs wireless transmission subsequent to that of the wireless slave device 1a. Therefore, by designating the acquisition time T1 of the first unrelated transmission information from the wireless slave device 1a as a reference, a period of 10 msec (for 10 clocks) starting from time T2 after 10 msec (which is Δt2 in FIG. 6 and corresponds 10 clocks) which is the time slot length of one wireless slave device is determined to be the time slot ts2 for wireless transmission of the wireless slave device 2a. Furthermore, after the time slot ts2 is determined, the internal time of the wireless slave device 2a is corrected. Then, the time T2 specified by the corrected internal time is set as a start timing of the time slot ts2 of the wireless slave device 2a.

In the same manner, with respect to the wireless slave device 3a, in consideration of the transmission order information of FIG. 4, by designating the acquisition time T1 of the first unrelated transmission information from the wireless slave device 1a as a reference, a period of 10 msec (for 10 clocks) starting from the time T3 after 20 msec (which is Δt3 in FIG. 6 and corresponds to 20 clocks) which is a time slot length for two wireless slave devices is determined to be the time slot ts3 for wireless transmission of the wireless slave device 3a. In the same manner as in the wireless slave device 2a, the internal time of the wireless slave device 3a is also corrected and the time T3 specified by the corrected internal time is set as the start timing of the time slot ts3 of the wireless slave device 3a. In the same manner, with respect to the wireless slave device 4a, in consideration of the transmission order information of FIG. 4, by designating the acquisition time T1 of the first unrelated transmission information from the wireless slave device 1a as a reference, a period of 10 msec (for 10 clocks) starting from the time T4 after 30 msec (which is Δt4 in FIG. 6 and corresponds to 30 clocks) which is a time slot length for three wireless slave devices is determined to be the time slot ts4 for wireless transmission of the wireless slave device 4a. In the same manner as in the wireless slave device 2a, the internal time of the wireless slave device 4a is also corrected and the time T4 specified by the corrected internal time is set as the start timing of the time slot ts4 of the wireless slave device 4a.

Then, at the times T2, T3, and T4 included in the time slots ts2, ts3, and ts4 determined in this manner, the wireless slave devices 2a to 4a wirelessly transmit the transmission information to the corresponding master devices 2b to 4b. In the example illustrated in FIG. 5, the wireless slave devices 2a, 3a, and 4a sequentially perform wireless transmission subsequent to that of the wireless slave device 1a in accordance with the transmission order determined by the transmission order information. When the wireless slave device 2a performs wireless transmission to the master device 2b corresponding to the wireless slave device 2a in the time slot ts2, the wireless slave devices 3a and 4a acquire the transmission information as the first unrelated transmission information, and also re-correct the internal times of the wireless slave devices 3a and 4a in the time slot ts2. In the same manner, when the wireless slave device 3a performs wireless transmission to the master device 3b corresponding to the wireless slave device 3a in the time slot ts3, the wireless slave devices 2a and 4a acquire the transmission information as the first unrelated transmission information, and also re-correct the internal times of the wireless slave devices 2a and 4a in the time slot ts3. Also, when the wireless slave device 4a performs wireless transmission to the master device 4b corresponding to the wireless slave device 4a in the time slot ts4, the wireless slave devices 2a and 3a acquire the transmission information as the first unrelated transmission information, and also re-correct the internal times of the wireless slave devices 2a and 3a in the time slot ts4. By re-correcting the internal time after determining a time slot of each wireless slave device in this manner, it is possible to implement wireless transmission in the time slot determined with the time offset eliminated as much as possible and thus high-speed and high-reliability information collection is enabled.

Also, the correction of the internal time in the wireless slave device 3a in the time slot ts3 will be specifically described with reference to FIG. 5 again. A processing time required for the wireless slave device 2a to acquire the transmission information is indicated by Δt when the wireless slave device 3a performs the wireless transmission and an acquisition time t' of the wireless slave device 2a is a time specified in accordance with the internal time of the wireless slave device 2a. Here, because the time slot number n of the time slot ts3 is 3, the transmission time T1 calculated in accordance with Equation (1) is indicated by t1=t'−10 msec× 2−Δt, and the correction of the internal time is performed according to the time offset Toffset which is a difference between the transmission time t1 and the reference transmission time TS1.

Here, in correspondence with the wireless transmission of the transmission information from the wireless slave device 4a at the time T4, the acquisition unit 152 of the wireless slave device 1a of the information collection pair 1 acquires the transmission information at the same time and thereafter the time slot determination unit 153 determines the time slot ts1 for wireless transmission in the next wireless slave device 1a. A correlation between the acquisition time T4 in the wireless slave device 1a at this time and the determined time slot ts1 is shown in an upper part of FIG. 7. As shown in the transmission order information of FIG. 4, the wireless slave device 1a performs wireless transmission subsequent to that of the wireless slave device 4a. Therefore, by designating the acquisition time T4 of the first unrelated transmission information from the wireless slave device 4a as a reference, a period of 10 msec (for 10 clocks) starting from the time T5 after 10 msec (which is Δt1 in FIG. 7 and corresponds 10 clocks) which is the time slot length for one wireless slave device is determined to be the time slot ts1 for wireless transmission of the wireless slave device 1a. Also, because the wireless slave device 1a is a reference wireless slave device, the internal time of the wireless slave device 1a is not corrected.

Figure 7:
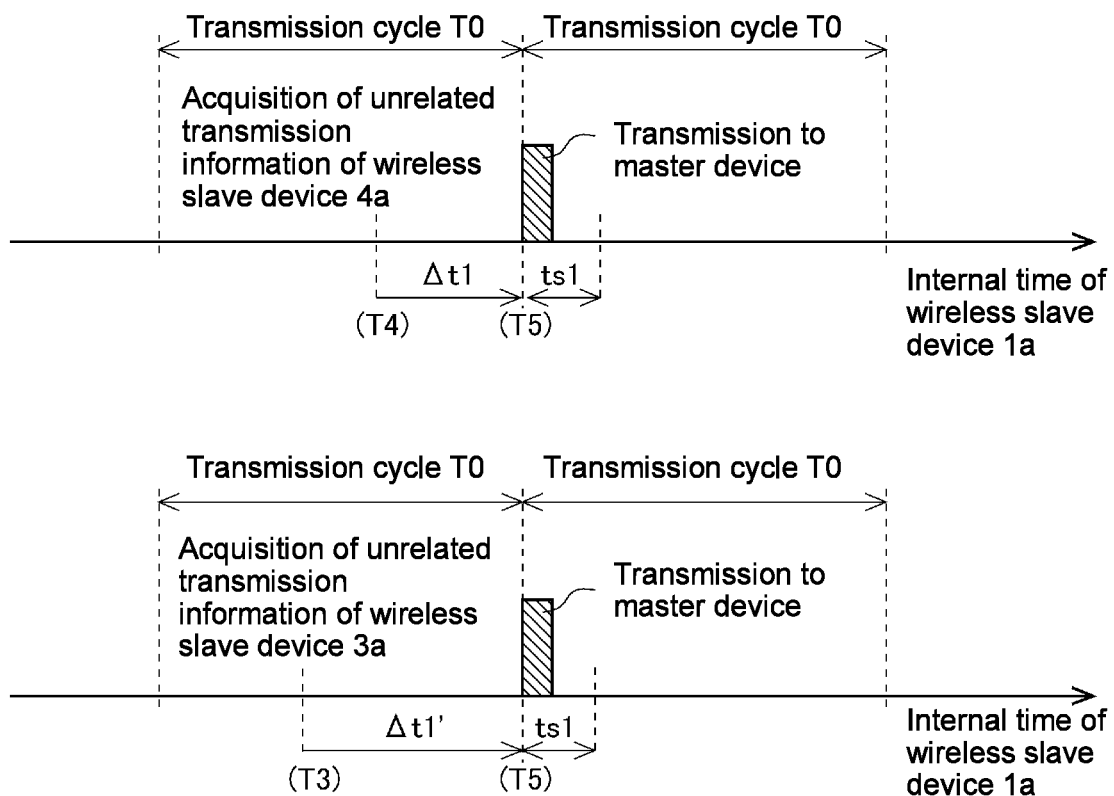
FIG. 7 is a diagram illustrating a timing of wireless transmission to a master device of a wireless slave device 1a performed by the wireless slave device 1a in the information exchange illustrated in FIG. 5.

In a lower part of FIG. 7, a correlation between the acquisition time T3 and the determined time slot is 1 when the acquisition unit 152 provided in the wireless slave device 1a of the information collection pair 1 acquires transmission information from the wireless slave device 3a and the time slot determination unit 153 determines a time slot for wireless transmission in the next wireless slave device 1a thereafter is illustrated. Even in this case, because the time slot is 1 is determined based on the transmission order information of FIG. 4, it coincides with the time slot ts1 shown in the upper part of FIG. 7. Then, at the time T5 included in the time slot ts1 determined as described above, the wireless slave device 1a wirelessly transmits the transmission information to the master device 1b.

<Other Examples of Correction of Internal Time>

As illustrated in FIG. 5, if the wireless slave devices 2a to 4a wirelessly transmit the transmission information to the master devices 2b to 4b corresponding to the wireless slave devices 2a to 4a, the internal time is not corrected in time slots of the wireless slave devices. Then, the internal time is corrected in a period corresponding to a time slot of the next other wireless slave device. For example, when the wireless slave device 2a performs wireless transmission to the master device 2b corresponding to the wireless slave device 2a in the time slot ts2, the wireless slave device 2a corrects the internal time in a period corresponding to the time slot ts3 of the next wireless slave device 3a without correcting the internal time in the time slot ts2. In such a case, because a time offset calculated in the period corresponding to the time slot ts3 in the wireless slave device 2a is an amount of offset in a so-called accumulated time period for two time slots, an amount of correction may become too large when the internal time is corrected based on the calculated time offset as it is. Therefore, when the internal time is corrected in a period corresponding to a time slot of another wireless slave device which is subsequent to the time slot of the wireless slave device as described above, the internal time of the wireless slave device may be corrected based on a value of half the time offset |Toffset| calculated according to Equation (1).

<Flow 2 of Wireless Transmission of Transmission Information in System 10>

Figure 8:
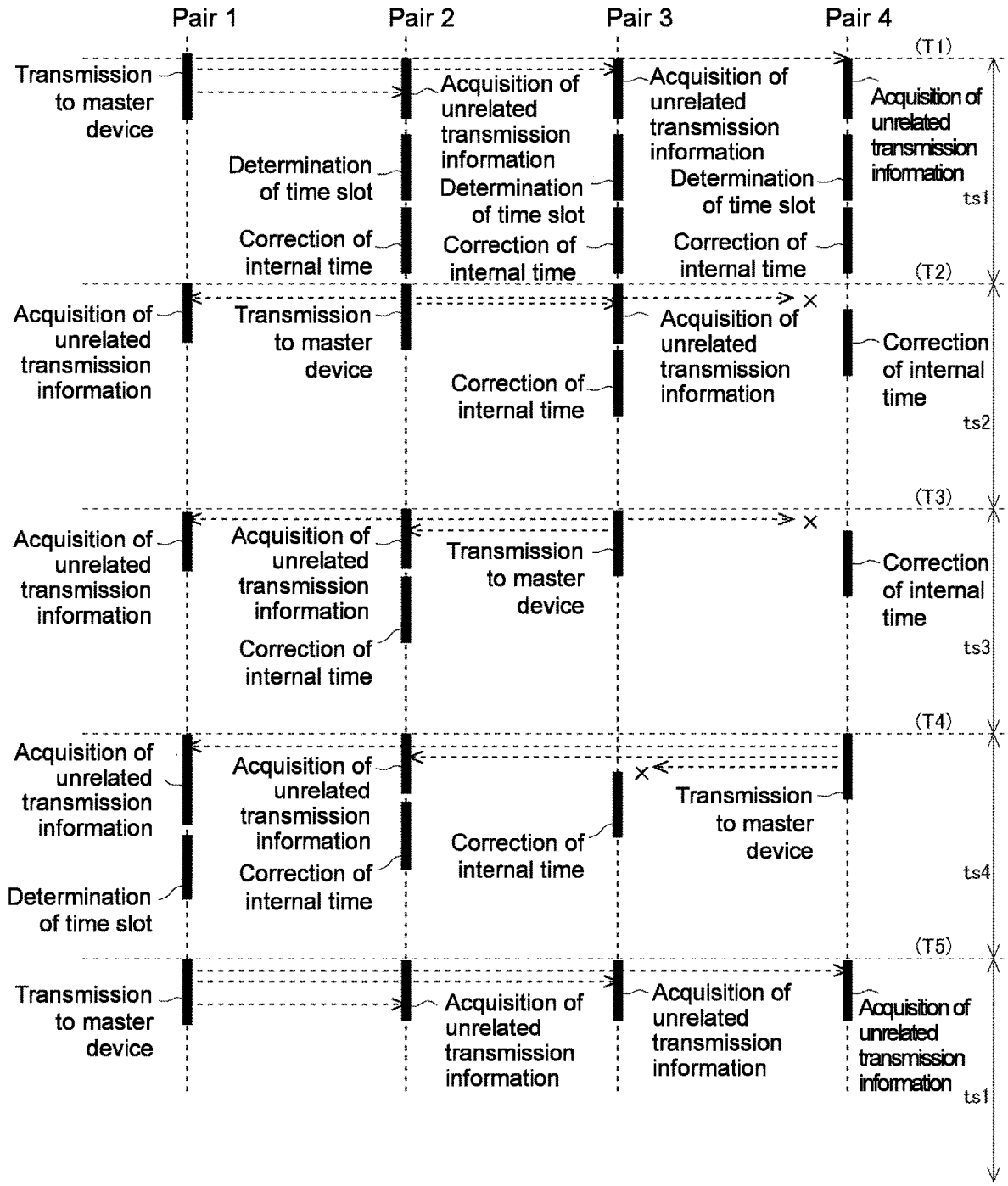
FIG. 8 is a second diagram illustrating a flow of information exchange performed in the wireless information system illustrated in FIG. 1.

Another flow of wireless transmission of transmission information in the system 10 will be described with reference to FIG. 8. A processing flow illustrated in FIG. 8 is different from the processing flow illustrated in FIG. 5 in that the wireless slave device 4a of the information collection pair 4 cannot acquire the transmission information from the wireless slave device 2a as unrelated transmission information at the time T2, that the wireless slave device 4a of the information collection pair 4 cannot acquire the transmission information from the wireless slave device 3a as the unrelated transmission information at the time T3, and that the wireless slave device 3a of the information collection pair 3 cannot acquire the transmission information from the wireless slave device 4a as the unrelated transmission information at the time T4. Shadowing by the group of robots 21 or the like may be exemplified as a cause of such a failure of acquisition of the unrelated transmission information.

In such a case, even in a wireless slave device which is not capable of acquiring unrelated transmission information, the internal time is corrected using reference transmission time information extracted from previously acquired unrelated transmission information in one transmission cycle when wireless transmission by the wireless slave device 1a, which is the reference wireless slave device, is designated as a reference (the processing of S113). For example, the reference transmission time information extracted from the unrelated transmission information (the first unrelated transmission information) acquired in the time slot ts1 is used with respect to the correction of the internal time in the wireless slave device 4a in the time slots ts2 and ts3. Also, as another method, the above-described correction may be performed using an average value of amounts of correction of the internal time in a plurality of times in the past or an amount of correction of the internal time obtained in a preliminary trial operation.

Also, in one transmission cycle when wireless transmission by the wireless slave device 1a, which is the reference wireless slave device, is designated as the reference, a wireless slave device, which is not capable of acquiring the unrelated transmission information (the first unrelated transmission information), (e.g., the wireless slave device 4a) may include error information indicating that the unrelated transmission information cannot be acquired in an immediately previous time slot ts3 and reference transmission time information has not arrived at the wireless slave device 4a in transmission information when the wireless slave device 4a performs wireless transmission to the master device 4b corresponding to the wireless slave device 4*a* in the time slot ts4 in addition to measurement information and identification information of the wireless slave device 4*a*. The wireless slave device acquiring the transmission information including the error information (for example, the wireless slave device 2*a* in the time slot ts4) as described above acquires second unrelated transmission information. In this case, the internal time is corrected using the reference transmission time information extracted from previously acquired unrelated transmission information in one transmission cycle when wireless transmission by the wireless slave device 1*a* which is the wireless slave device is designated as a reference (processing of S109). As another method, the above-described correction may be performed using an average value of amounts of correction of the internal time in a plurality of times in the past or an amount of correction of the internal time obtained in a preliminary trial operation. Also, the wireless slave device 4*a* acquires the first unrelated transmission information in the time slot ts1 within one transmission cycle when the wireless transmission by the wireless slave device 1*a* which is the reference wireless slave device is designated as the reference and the reference transmission time information is extracted from the first unrelated transmission information. Therefore, as another method, in the wireless slave device 4*a*, in addition to the measurement information and the identification information of the wireless slave device 4*a*, the transmission information when the wireless slave device 4*a* performs wireless transmission to the master device 4*b* corresponding to the wireless slave device 4*a* in the time slot ts4 may include the reference transmission time information extracted in the time slot ts1. In this case, in the time slot ts4, the wireless slave device 2*a* can correct the internal time by using the reference transmission time information.

<Other Examples of Correction of Internal Time>

If the wireless slave devices 2*a* to 4*a* cannot acquire unrelated transmission information or when the wireless slave devices 2*a* to 4*a* acquire second unrelated transmission information including error information, the wireless slave devices 2*a* to 4*a* may not correct an internal time in a period corresponding to a time slot thereof. Also, in this case, if a period corresponding to a time slot for which the internal time is not corrected continues, an offset of the internal time for the period accumulates in the wireless slave device. Thus, when the internal time is corrected based on the calculated time offset as it is, an amount of correction may become too large. Therefore, if a period corresponding to a time slot for which the internal time is not corrected continues as described above, the internal time of the wireless slave device may be corrected based on a value obtained by dividing a value of the time offset |Toffset| calculated according to Equation (1) by the number of continuous periods when the internal time is corrected thereafter.

Example 2

Figure 9:
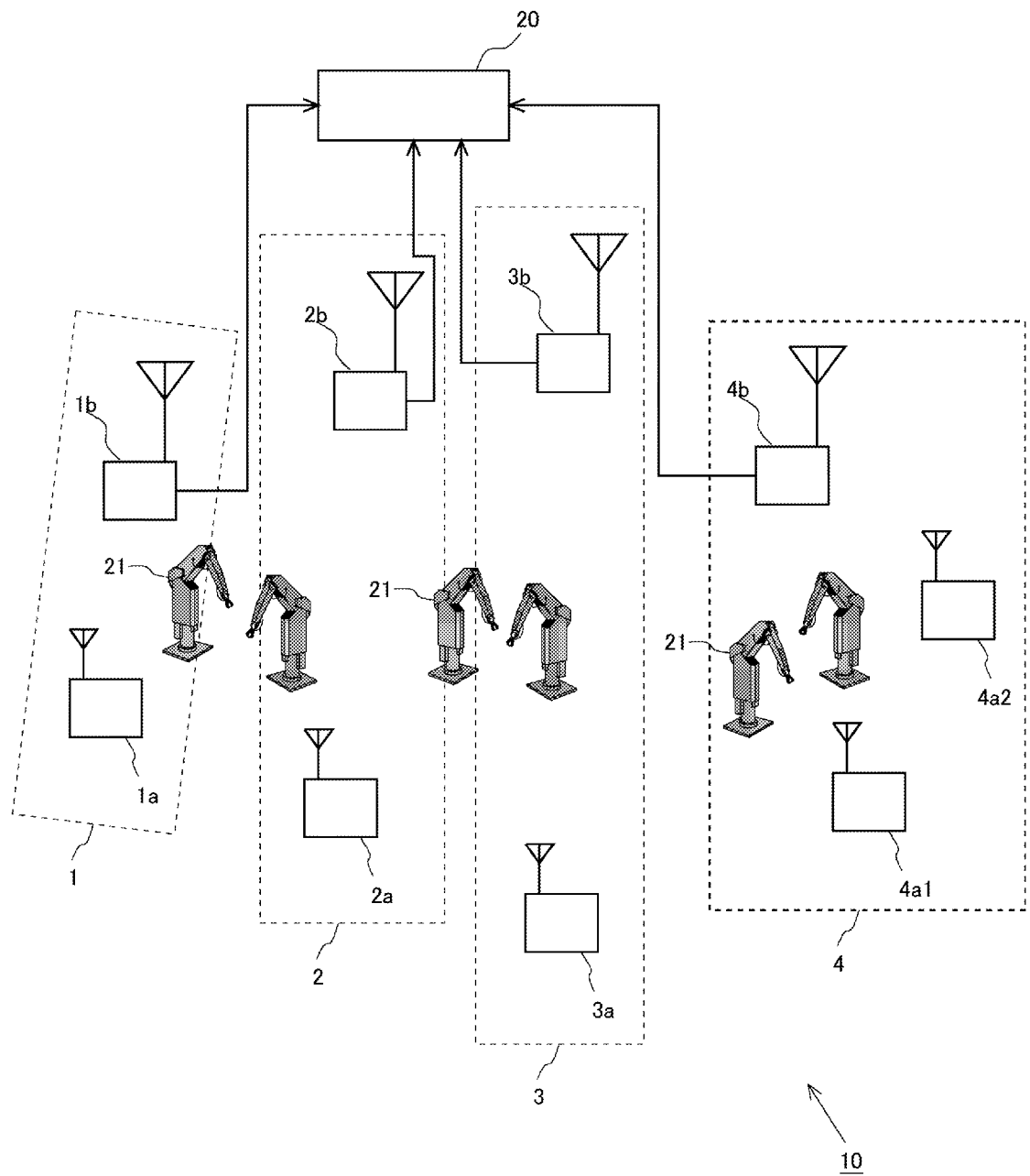
FIG. 9 is a second diagram illustrating a schematic configuration of the wireless information collection system according to the present disclosure.

Here, FIG. 9 illustrates a schematic configuration of a system 10 according to a second example of the present disclosure. In the configuration of the system 10 illustrated in FIG. 9, components substantially the same as those of the system 10 illustrated in FIG. 1 are denoted by the same reference numerals. Detailed description thereof will be omitted. Here, a difference between the system 10 illustrated in FIG. 9 and the system 10 illustrated in FIG. 1 is a configuration related to an information collection pair 4. Specifically, in the system 10 illustrated in FIG. 9, the information collection pair 4 includes two wireless slave devices 4*a*1 and 4*a*2 and further includes a common master device 4*b* corresponding to the wireless slave devices 4*a*1 and 4*a*2. Therefore, transmission information from each of the wireless slave devices 4*a*1 and 4*a*2 is wirelessly transmitted to the common master device 4*b* in accordance with a predetermined time division multiple access scheme, and is collected by an information processing device 20. Each of the wireless slave devices participating in such a system 10 has transmission order information on a transmission order of all the participating wireless slave devices to perform the above-described determination of a time slot of a wireless slave device and the above-described correction of an internal time in a wireless slave device other than a wireless slave device 1*a* and implement wireless transmission of transmission information while avoiding interference.

Figure 10:
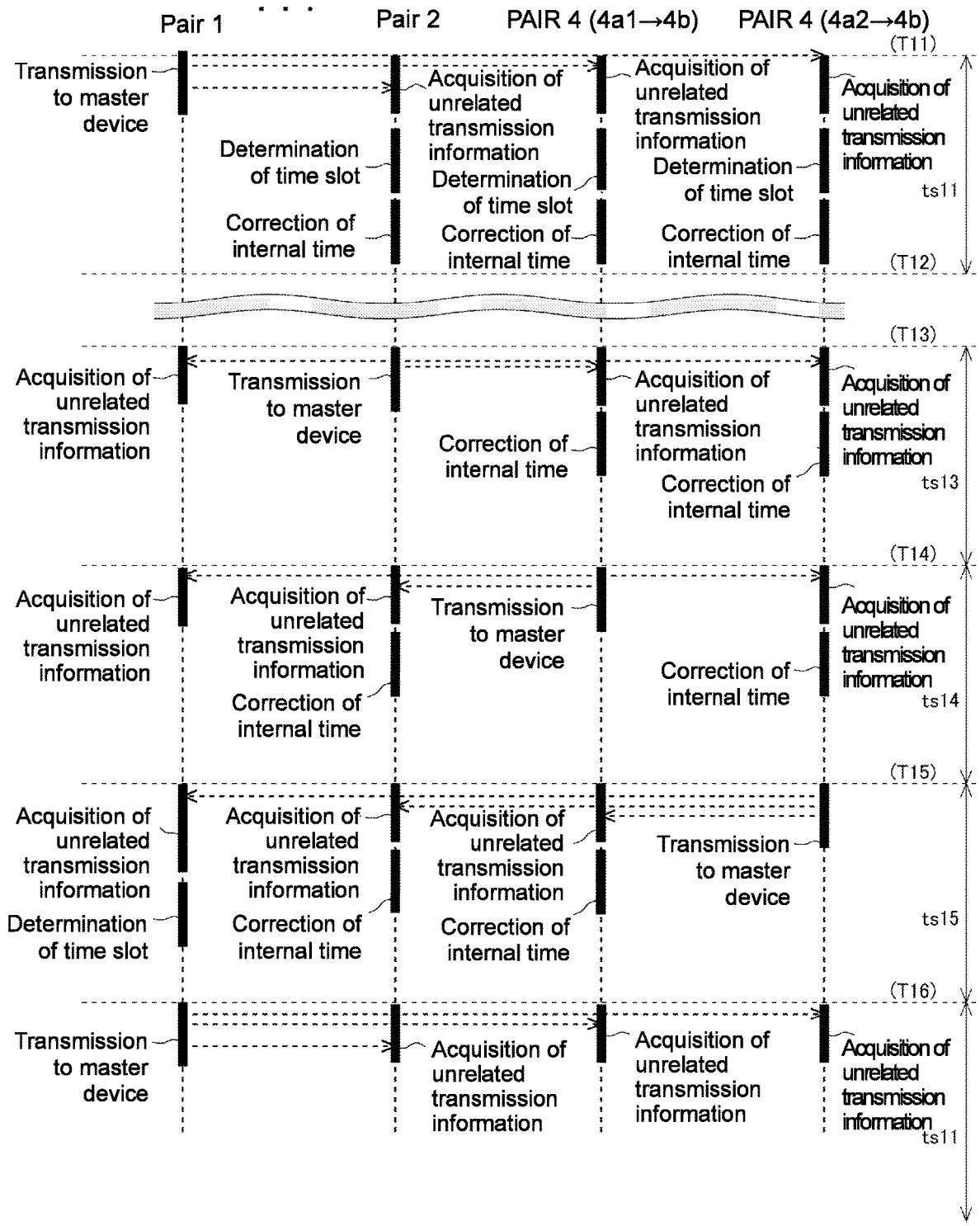
FIG. 10 is a diagram illustrating a flow of information exchange performed in the wireless information system illustrated in FIG. 9.

Therefore, FIG. 10 illustrates a processing flow of wireless transmission for collecting transmission information performed in the system 10 illustrated in FIG. 9. Also, for simplicity of description, description of an information collection pair 2 in FIG. 10 will be omitted. In the processing flow illustrated in FIG. 10, when the transmission information is transmitted from the wireless slave device 1*a* of an information collection pair 1 to a master device 1*b*, another wireless slave device tries to acquire the transmission information as first unrelated transmission information. As a result, all the wireless slave devices can acquire the first unrelated transmission information, time slots of the wireless slave devices are determined and internal times of the wireless slave devices are corrected. Also, when attention is paid to the information collection pair 4, for example, the wireless slave device 4*a*2 acquires transmission information transmitted by the wireless slave device 4*a*1 belonging to the same information collection pair 4 to the master device 4*b* as first unrelated transmission information in a time slot ts14 and corrects the internal time based on the acquired transmission information. That is, although the transmission information from the wireless slave device 4*a*1 is transmission information to the common master device 4*b* for the wireless slave device 4*a*2, such transmission information is also used as the first unrelated transmission information for internal time correction. In the processing flow illustrated in FIG. 10, the transmission information transmitted from the wireless slave device 4*a*2 to the master device 4*b* is acquired as unrelated transmission information for the wireless slave device 1*a* and used in the determination of the time slot of the wireless slave device 1*a* thereafter.

What is claimed is:

1. A wireless communication device configured to wirelessly transmit predetermined information provided in the wireless communication device to a master device corresponding to the wireless communication device in a predetermined transmission cycle, the wireless communication device executing wireless transmission in a time slot of the wireless communication device according to a predetermined time division multiple access scheme together with one or more wireless slave devices configured to wirelessly transmit information to master devices corresponding to the one or more wireless slave devices in the predetermined time division multiple access scheme, wherein the one or more wireless slave devices different from the wireless communication device, wherein at least a reference wireless slave device is included in the one or more wireless slave devices, the reference wireless slave device being configured to wirelessly transmit reference transmission time information related to a time at which the reference wireless slave device performs wireless transmission to the master device corresponding to the reference wireless slave device in the predetermined time division multiple access scheme in addition to information provided in the reference wireless slave device, wherein, if a wireless slave device other than the reference wireless slave device is included in the one or more wireless slave devices, a predetermined wireless slave device which is the wireless slave device is configured to wirelessly transmit the reference transmission time information arriving at the predetermined wireless slave device from the reference wireless slave device as a starting point to the master device corresponding to predetermined wireless slave device in the predetermined time division multiple access scheme in addition to information provided in the predetermined wireless slave device, and wherein the wireless communication device comprises:
a hardware controller configured
to count a time within the wireless communication device, the time slot of the wireless communication device being determined according to the time counted by the hardware controller;
to acquire first unrelated transmission information which is transmission information wirelessly transmitted from the reference wireless slave device to the master device corresponding to the reference wireless slave device in the predetermined time division multiple access scheme and which includes the reference transmission time information at the time of the wireless transmission or acquire first unrelated transmission information which is transmission information wirelessly transmitted from the predetermined wireless slave device to the master device corresponding to the predetermined wireless slave device in the predetermined time division multiple access scheme and which includes the reference transmission time information provided in the predetermined wireless slave device at the time of the wireless transmission; and
to correct the time counted based on an amount of correction calculated from an acquisition time of the first unrelated transmission information represented as the time counted and the reference transmission time information included in the first unrelated transmission information.

2. The wireless communication device according to claim 1, wherein the first unrelated transmission information is transmission information in which the master device corresponding to the wireless communication device is not set as a transmission destination.

3. The wireless communication device according to claim 1,
wherein the wireless communication device is configured so that the wireless communication device and at least one wireless slave device other than the reference wireless slave device among the one or more wireless slave devices have a master device, which is a transmission destination of wireless communication according to the predetermined time division multiple access scheme, in common, and
wherein the hardware controller acquires the first unrelated transmission information transmitted from the at least one wireless slave device to the master device in common in the predetermined time division multiple access scheme.

4. The wireless communication device according to claim 1, wherein, if the hardware controller acquires the first unrelated transmission information during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, corrects the time counted based on the amount of correction corresponding to the first unrelated transmission information within the period corresponding to the other device time slot.

5. The wireless communication device according to claim 1, wherein, if the hardware controller is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, corrects the time counted based on the amount of correction corresponding to other first unrelated transmission information within another device time slot if the hardware controller acquires the other first unrelated transmission information which is the first unrelated transmission information from a wireless slave device different from the reference wireless slave device or the predetermined wireless slave device during a period before the other device time slot in one predetermined transmission cycle when the wireless transmission by the reference wireless slave device is designated as the reference.

6. The wireless communication device according to claim 1,
wherein, if the hardware controller is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, the hardware controller does not correct the time counted within the period corresponding to the other device time slot, and
wherein, if the hardware controller acquires the first unrelated transmission information from the reference wireless slave device or the predetermined wireless slave device during a period corresponding to a predetermined other device time slot after a state in which the hardware controller is not able to acquire the first unrelated transmission information from the reference wireless slave device or the predetermined wireless slave device continues during a period corresponding to a predetermined number of the other device time slots which is two or more, corrects the time counted based on the amount of correction corresponding to the first unrelated transmission information and the predetermined number within the period corresponding to the predetermined other device time slot.

7. The wireless communication device according to claim 1,
wherein the predetermined wireless slave device is configured to wirelessly transmit error information indicating that the reference transmission time information has not arrived to the master device corresponding to the predetermined wireless slave device in the predetermined time division multiple access scheme in addition to information provided in the predetermined wireless slave device if the reference transmission time information has not arrived at the predetermined wireless slave device before the information provided in the predetermined wireless slave device is wirelessly transmitted to the master device corresponding to the predetermined wireless slave device, and
wherein, if the hardware controller acquires second unrelated transmission information including the error information, which is transmission information wirelessly transmitted to the master device corresponding to the predetermined wireless slave device in the predetermined time division multiple access scheme, from the predetermined wireless slave device instead of the first unrelated transmission information at the time of the wireless transmission during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, the hardware controller does not correct the time.

8. The wireless communication device according to claim 1,
wherein the predetermined wireless slave device is configured to wirelessly transmit error information indicating that the reference transmission time information has not arrived to the master device corresponding to the predetermined wireless slave device in the predetermined time division multiple access scheme in addition to information provided in the predetermined wireless slave device if the reference transmission time information has not arrived at the predetermined wireless slave device before the information provided in the predetermined wireless slave device is wirelessly transmitted to the master device corresponding to the predetermined wireless slave device, and
wherein, if the hardware controller acquires second unrelated transmission information including the error information, which is transmission information wirelessly transmitted to the master device corresponding to the predetermined wireless slave device in the predetermined time division multiple access scheme, from the predetermined wireless slave device instead of the first unrelated transmission information at the time of the wireless transmission during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as the reference, corrects the time counted based on the amount of correction corresponding to other first unrelated transmission information within the period corresponding to the other device time slot if the hardware controller acquires the other first unrelated transmission information which is the first unrelated transmission information from a wireless slave device different from the predetermined wireless slave device during a period before the other device time slot in one predetermined transmission cycle when the wireless transmission by the reference wireless slave device is designated as the reference.

9. The wireless communication device according to claim 1, further comprising:
the hardware controller configured to transmit the predetermined information to the master device corresponding to the wireless communication device in the time slot of the wireless communication device,
wherein, if the hardware controller acquires the first unrelated transmission information during a period corresponding to another device time slot according to the predetermined time division multiple access scheme in which the reference wireless slave device or the predetermined wireless slave device performs the wireless transmission to the master device corresponding to the reference wireless slave device or the predetermined wireless slave device in a time slot immediately before the time slot of the wireless communication device in one predetermined transmission cycle when the wireless transmission by the reference wireless slave device is designated as a reference, transmits the reference transmission time information included in the first unrelated transmission information to the master device corresponding to the wireless communication device together with the predetermined information, and
wherein, if the hardware controller does not acquire the first unrelated transmission information during the period corresponding to the other device time slot in the one predetermined transmission cycle when the wireless transmission by the reference wireless slave device is designated as the reference, transmits error information indicating that the reference transmission time information has not arrived to the master device corresponding to the wireless communication device together with the predetermined information.

10. The wireless communication device according to claim 1, further comprising:
the hardware controller configured to transmit the predetermined information to the master device corresponding to the wireless communication device in the time slot of the wireless communication device,
wherein, if the hardware controller acquires the first unrelated transmission information at least once during a period before the time slot of the wireless communication device in one predetermined transmission cycle when the wireless transmission by the reference wireless slave device is designated as a reference, the hardware controller transmits the reference transmission time information included in the first unrelated transmission information to the master device corresponding to the wireless communication device together with the predetermined information, and
wherein, if the hardware controller does not acquire the first unrelated transmission information during the period before the time slot of the wireless communication device in the one predetermined transmission cycle when the wireless transmission by the reference wireless slave device is designated as the reference, transmits error information indicating that the reference transmission time information has not arrived to the master device corresponding to the wireless communication device together with the predetermined information.

11. The wireless communication device according to claim 1,
wherein the reference wireless slave device is configured to wirelessly transmit the reference transmission time information to the master device corresponding to the reference wireless slave device in the predetermined time division multiple access scheme in addition to information provided in the reference wireless slave device and identification information for identifying the reference wireless slave device,
wherein the predetermined wireless slave device is configured to wirelessly transmit the reference transmission time information arriving at the predetermined wireless slave device from the reference wireless slave device as a starting point to the master device corresponding to the predetermined wireless slave device in the predetermined time division multiple access scheme in addition to the information provided in the predetermined wireless slave device and the identification information for identifying the predetermined wireless slave device,
wherein the hardware controller acquires the first unrelated transmission information including the identification information for identifying the reference wireless slave device and the reference transmission time information from the reference wireless slave device at the time of the wireless transmission or acquire the first unrelated transmission information including the identification information for identifying the predetermined wireless slave device and the reference transmission time information provided in the predetermined wireless slave device from the predetermined wireless slave device at the time of the wireless transmission, and
wherein
the hardware controller configured to store transmission order information related to an order of wireless transmission of the one or more wireless slave devices and the wireless communication device in the predetermined time division multiple access scheme; and
to determine the time slot of the wireless communication device based on the identification information included in the first unrelated transmission information, an acquisition time of the first unrelated transmission information, and the transmission order information stored.

12. The wireless communication device according to claim 11, wherein the hardware controller recognizes the reference wireless slave device or the predetermined wireless slave device which is a transmission entity of the first unrelated transmission information based on the identification information included in the first unrelated transmission information and determines the time slot of the wireless communication device within the predetermined transmission cycle of the wireless communication device counted based on a correlation between the reference wireless slave device or the predetermined wireless slave device and the wireless communication device in the transmission order information and the acquisition time.

13. A wireless information collection system having a plurality of wireless communication combinations, each of the wireless communication combinations is formed by a wireless communication device, which is configured to wirelessly transmit predetermined information provided in the wireless communication device to a master device corresponding to the wireless communication device in a predetermined transmission cycle, and the master device, the wireless transmission being executed in accordance with a predetermined time division multiple access scheme,
wherein the wireless communication device included in one wireless communication combination among the plurality of wireless communication combinations is a reference wireless slave device, the reference wireless slave device being configured to wirelessly transmit reference transmission time information related to a time at which the reference wireless slave device performs wireless transmission to the master device corresponding to the reference wireless slave device in addition to information provided in the reference wireless slave device in the predetermined time division multiple access scheme,
wherein the wireless communication device included in each of wireless communication combinations other than the one wireless communication combination among the plurality of wireless communication combinations comprises:
a hardware controller configured to count a time within the wireless communication device, wherein a time slot of the wireless communication device is determined according to the time counted by the hardware controller;
to acquire first unrelated transmission information which is transmission information wirelessly transmitted from the reference wireless slave device to the master device corresponding to the reference wireless slave device in the predetermined time division multiple access scheme and which includes the reference transmission time information at the time of the wireless transmission or acquire first unrelated transmission information which is transmission information wirelessly transmitted from a predetermined wireless slave device to a master device corresponding to the predetermined wireless slave device in the predetermined time division multiple access scheme and which includes the reference transmission time information provided in the predetermined wireless slave device at the time of the wireless transmission;
to correct the time counted based on an amount of correction calculated from an acquisition time of the first unrelated transmission information represented as the time and the reference transmission time information included in the first unrelated transmission information; and
to transmit the predetermined information to the master device corresponding to the wireless communication device in the time slot of the wireless communication device, and
wherein each of master devices in the plurality of wireless communication combinations comprises:
a master-device-side transmitter configured to transmit the predetermined information wirelessly transmitted from the wireless communication device corresponding to the master device to a predetermined information processing device.

14. A wireless communication method of wirelessly transmitting predetermined information provided in a wireless communication device to a master device corresponding to the wireless communication device in a predetermined transmission cycle,
- wherein the wireless communication device executes the wireless transmission in a time slot of the wireless communication device according to a predetermined time division multiple access scheme together with one or more wireless slave devices configured to wirelessly transmit information in the predetermined time division multiple access scheme, wherein the one or more wireless slave devices different from the wireless communication device;
- wherein at least a reference wireless slave device is included in the one or more wireless slave devices, the reference wireless slave device being configured to wirelessly transmit reference transmission time information related to a time at which the reference wireless slave device performs wireless transmission to the master device corresponding to the reference wireless slave device in addition to information provided in the reference wireless slave device in the predetermined time division multiple access scheme,
- wherein, if a wireless slave device other than the reference wireless slave device is included in the one or more wireless slave devices, a predetermined wireless slave device which is the wireless slave device is configured to wirelessly transmit the reference transmission time information arriving at the predetermined wireless slave device from the reference wireless slave device as a starting point to the master device corresponding to the predetermined wireless slave device in the predetermined time division multiple access scheme in addition to information provided in the predetermined wireless slave device,
- wherein, in the wireless communication device, a hardware controller counts a time within the wireless communication device, the time slot of the wireless communication device being determined according to the time counted by the hardware controller, and
- wherein the wireless communication method comprises the steps of:
- acquiring first unrelated transmission information which is transmission information wirelessly transmitted from the reference wireless slave device to the master device corresponding to the reference wireless slave device in the predetermined time division multiple access scheme and which includes the reference transmission time information at the time of the wireless transmission or acquiring first unrelated transmission information which is transmission information wirelessly transmitted from the predetermined wireless slave device to the master device corresponding to the predetermined wireless slave device in the predetermined time division multiple access scheme and which includes the reference transmission time information provided in the predetermined wireless slave device at the time of the wireless transmission; and
- correcting the time counted based on an amount of correction calculated from an acquisition time of the first unrelated transmission information represented as the time and the reference transmission time information included in the first unrelated transmission information.

15. The wireless communication device according to claim 2, wherein, if the hardware controller acquires the first unrelated transmission information during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, corrects the time counted based on the amount of correction corresponding to the first unrelated transmission information within the period corresponding to the other device time slot.

16. The wireless communication device according to claim 3, wherein, if the hardware controller acquires the first unrelated transmission information during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, corrects the time counted based on the amount of correction corresponding to the first unrelated transmission information within the period corresponding to the other device time slot.

17. The wireless communication device according to claim 2, wherein, if the hardware controller is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, corrects the time counted based on the amount of correction corresponding to other first unrelated transmission information within another device time slot if the hardware controller acquires the other first unrelated transmission information which is the first unrelated transmission information from a wireless slave device different from the reference wireless slave device or the predetermined wireless slave device during a period before the other device time slot in one predetermined transmission cycle when the wireless transmission by the reference wireless slave device is designated as the reference.

18. The wireless communication device according to claim 3, wherein, if the hardware controller is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, corrects the time counted based on the amount of correction corresponding to other first unrelated transmission information within another device time slot if the hardware controller acquires the other first unrelated transmission information which is the first unrelated transmission information from a wireless slave device different from the reference wireless slave device or the predetermined wireless slave device during a period before the other device time slot in one predetermined transmission cycle when the wireless transmission by the reference wireless slave device is designated as the reference.

19. The wireless communication device according to claim 2, wherein, if the hardware controller is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, hardware controller does not correct the time counted within the period corresponding to the other device time slot, and wherein, if the hardware controller acquires the first unrelated transmission information from the reference wireless slave device or the predetermined wireless slave device during a period corresponding to a predetermined other device time slot after a state in which the acquisition unit is not able to acquire the first unrelated transmission information from the reference wireless slave device or the predetermined wireless slave device continues during a period corresponding to a predetermined number of the other device time slots which is two or more, corrects the time counted based on the amount of correction corresponding to the first unrelated transmission information and the predetermined number within the period corresponding to the predetermined other device time slot.

20. The wireless communication device according to claim 3, wherein, if the hardware controller is not able to acquire the first unrelated transmission information from the reference wireless slave device or the predetermined wireless slave device during a period corresponding to another device time slot according to the predetermined time division multiple access scheme in which the reference wireless slave device or the predetermined wireless slave device performs wireless transmission to the master device corresponding to the reference wireless slave device or the predetermined wireless slave device in one predetermined transmission cycle when the wireless transmission by the reference wireless slave device is designated as a reference, the hardware controller does not correct the time counted within the period corresponding to the other device time slot, and wherein, if the hardware controller acquires the first unrelated transmission information from the reference wireless slave device or the predetermined wireless slave device during a period corresponding to a predetermined other device time slot after a state in which the hardware controller is not able to acquire the first unrelated transmission information from the reference wireless slave device or the predetermined wireless slave device continues during a period corresponding to a predetermined number of the other device time slots which is two or more, corrects the time counted based on the amount of correction corresponding to the first unrelated transmission information and the predetermined number within the period corresponding to the predetermined other device time slot.

* * * * *